United States Patent
Ozaki

(10) Patent No.: US 8,606,335 B2
(45) Date of Patent: Dec. 10, 2013

(54) IN-VEHICLE HANDSFREE APPARATUS AND DATA TRANSFER METHOD

(75) Inventor: Takahisa Ozaki, Gamagori (JP)

(73) Assignee: Denso Corporation, Kariya (JP)

( * ) Notice: Subject to any disclaimer, the term of this patent is extended or adjusted under 35 U.S.C. 154(b) by 839 days.

(21) Appl. No.: 12/517,304

(22) PCT Filed: Dec. 7, 2007

(86) PCT No.: PCT/JP2007/073652
§ 371 (c)(1),
(2), (4) Date: Jun. 2, 2009

(87) PCT Pub. No.: WO2008/069299
PCT Pub. Date: Jun. 12, 2008

(65) Prior Publication Data
US 2010/0062714 A1    Mar. 11, 2010

(30) Foreign Application Priority Data

Dec. 8, 2006 (JP) ................................ 2006-331875
Apr. 27, 2007 (JP) ................................ 2007-118937
Sep. 4, 2007 (JP) ................................ 2007-229467
Dec. 3, 2007 (JP) ................................ 2007-312290

(51) Int. Cl.
*H04M 1/00* (2006.01)

(52) U.S. Cl.
USPC .............. 455/569.2; 455/569.1; 455/41.2; 455/41.3

(58) Field of Classification Search
USPC .......... 455/41.2, 414.1, 41.3, 456.3, 466, 455/569.1, 569.2, 566, 575.9; 345/173
See application file for complete search history.

(56) References Cited

U.S. PATENT DOCUMENTS

| 7,251,507 B2 | 7/2007 | Kitao et al. |
| 2003/0114202 A1 | 6/2003 | Suh et al. |
| 2005/0070336 A1* | 3/2005 | Tamura ........................ 455/567 |
| 2006/0252374 A1* | 11/2006 | Ban et al. ..................... 455/41.3 |

(Continued)

FOREIGN PATENT DOCUMENTS

| CN | 1426914 A | 7/2003 |
| JP | H11-331418 A | 11/1999 |

(Continued)

OTHER PUBLICATIONS

Office action dated Nov. 30, 2010 in corresponding Korean Application No. 10-2009-7014189.

(Continued)

*Primary Examiner* — Edward Urban
*Assistant Examiner* — Golam Sorowar
(74) *Attorney, Agent, or Firm* — Harness, Dickey & Pierce, PLC

(57) ABSTRACT

An in-vehicle navigation apparatus with a handsfree function establishes a Bluetooth communication link with a cellular phone. When receiving from the cellular phone outgoing call history data and incoming call history data, which were stored in the cellular phone before establishing the Bluetooth communication link, the in-vehicle navigation apparatus stores, in a work memory, the received outgoing call history data and the received incoming call history data, equally to, of the navigation apparatus itself, outgoing call history data and incoming call history data. An outgoing call operation then becomes possible using outgoing call history data and incoming call history data, which are stored in the work memory.

11 Claims, 16 Drawing Sheets

(56) References Cited

U.S. PATENT DOCUMENTS

| | | | |
|---|---|---|---|
| 2006/0256734 A1* | 11/2006 | Erhart et al. | 370/254 |
| 2006/0262103 A1* | 11/2006 | Hu et al. | 345/173 |
| 2007/0016362 A1 | 1/2007 | Nelson | |
| 2007/0178944 A1 | 8/2007 | Mitsuru et al. | |
| 2007/0232335 A1* | 10/2007 | Harada et al. | 455/466 |
| 2009/0011799 A1 | 1/2009 | Douthitt et al. | |

FOREIGN PATENT DOCUMENTS

| | | |
|---|---|---|
| JP | 2002-193046 A | 7/2002 |
| JP | 2003-163965 A | 6/2003 |
| JP | 2003-198713 | 7/2003 |
| JP | 2003-198713 A | 7/2003 |
| JP | 2004-266644 A | 9/2004 |
| JP | 2005-236615 A | 9/2005 |
| JP | 2005-252448 A | 9/2005 |
| JP | 2005-323265 A | 11/2005 |
| JP | 2006-311143 A | 11/2006 |
| JP | 2008-098767 A | 4/2008 |
| JP | 2008-139148 A | 6/2008 |
| KR | 2003-90 | 1/2003 |
| KR | 10-2004-0074808 | 8/2004 |

OTHER PUBLICATIONS

International Search Report and Written Opinion dated Feb. 26, 2008 from corresponding PCT Application No. PCT/JP2007/073652.

Office action dated Aug. 26, 2010 in corresponding Russian Application No. 2009126146.

Office Action dated Sep. 15, 2011 in corresponding Chinese Application No. 200780045454.9 with English translation thereof.

Extended Search Report dated Apr. 10, 2012 in corresponding EP application No. 07850257.2.

Office Action mailed Jun. 12, 2012 in a corresponding Japanese application No. 2007-312290 with English translation thereof.

* cited by examiner

FIG. 3A

| OUTGOING CALL HISTORY DATA | | |
|---|---|---|
| YOSHIDA ○○ | 090XXXXXXX | 12:15 AUG 10 |
| IMAIZUMI ○○ | 090XXXXXXX | 12:00 AUG 10 |
| YOSHIDA ○○ | 090XXXXXXX | 11:20 AUG 10 |
| TAMURA ○○ | 090XXXXXXX | 11:10 AUG 10 |
| TAMURA ○○ | 090XXXXXXX | 10:50 AUG 10 |
| HARADA ○○ | 090XXXXXXX | 10:15 AUG 10 |

FIG. 3B

| PHONE BOOK DATA | |
|---|---|
| OOMORI ○○ | 090XXXXXXX |
| OKABAYASHI ○○ | 090XXXXXXX |
| HAYASHIDA ○○ | 090XXXXXXX |
| TAGAMI ○○ | 090XXXXXXX |
| YAMAOKA ○○ | 090XXXXXXX |
| KANEDA ○○ | 090XXXXXXX |
| TEZIMA ○○ | 090XXXXXXX |

FIG. 3C

| OUTGOING CALL HISTORY DATA | | |
|---|---|---|
| OOMORI ○○ | 090XXXXXXX | 13:40 AUG 10 |
| YOSHIDA ○○ | 090XXXXXXX | 12:15 AUG 10 |
| IMAIZUMI ○○ | 090XXXXXXX | 12:00 AUG 10 |
| YOSHIDA○○ | 090XXXXXXX | 11:20 AUG 10 |
| TAMURA ○○ | 090XXXXXXX | 11:10 AUG 10 |
| TAMURA ○○ | 090XXXXXXX | 10:50 AUG 10 |

← DISPLAY REGISTRATION NAME IN PHONE BOOK

FIG. 4A

| INCOMING CALL HISTORY DATA | | |
|---|---|---|
| TAKAHASHI ○○ | 090XXXXXXX | 13:00 AUG 10 |
| MURAOKA ○○ | 090XXXXXXX | 12:25 AUG 10 |
| MORINO ○○ | 090XXXXXXX | 11:45 AUG 10 |
| TAKAHASHI ○○ | 090XXXXXXX | 11:15 AUG 10 |
| OKADA ○○ | 090XXXXXXX | 11:10 AUG 10 |
| UEDA ○○ | 090XXXXXXX | 10:20 AUG 10 |

FIG. 4B

| PHONE BOOK DATA | |
|---|---|
| OOMORI ○○ | 090XXXXXXX |
| OKABAYASHI ○○ | 090XXXXXXX |
| HAYASHIDA ○○ | 090XXXXXXX |
| YAMAOKA ○○ | 090XXXXXXX |
| KANEDA ○○ | 090XXXXXXX |
| TEZIMA ○○ | 090XXXXXXX |

FIG. 4C

| INCOMING CALL HISTORY DATA | | |
|---|---|---|
| YAMAOKA○○ | 090XXXXXXX | 13:25 AUG 10 | ← DISPLAY REGISTRATION NAME IN PHONE BOOK
| TAKAHASHI ○○ | 090XXXXXXX | 13:00 AUG 10 |
| MURAOKA ○○ | 090XXXXXXX | 12:25 AUG 10 |
| MORINO ○○ | 090XXXXXXX | 11:45 AUG 10 |
| TAKAHASHI ○○ | 090XXXXXXX | 11:15 AUG 10 |
| OKADA ○○ | 090XXXXXXX | 11:10 AUG 10 |

FIG. 5A

| MISSED INCOMING CALL HISTORY DATA | | |
|---|---|---|
| TANAKA ○○ | 090XXXXXXX | 12:28 AUG 10 |
| SAITO ○○ | 090XXXXXXX | 12:24 AUG 10 |
| HIGASHIDA ○○ | 090XXXXXXX | 12:06 AUG 10 |
| KITAMURA ○○ | 090XXXXXXX | 11:04 AUG 10 |
| SAITO ○○ | 090XXXXXXX | 10:54 AUG 10 |
| KOMURA ○○ | 090XXXXXXX | 10:24 AUG 10 |

FIG. 5B

| PHONE BOOK DATA | |
|---|---|
| OOMORI ○○ | 090XXXXXXX |
| OKABAYASHI ○○ | 090XXXXXXX |
| HAYASHIDA ○○ | 090XXXXXXX |
| TAGAMI ○○ | 090XXXXXXX |
| YAMAOKA ○○ | 090XXXXXXX |
| KANEDA ○○ | 090XXXXXXX |
| TEZIMA ○○ | 090XXXXXXX |

FIG. 5C

| MISSED INCOMING CALL HISTORY DATA | | |
|---|---|---|
| KANEDA ○○ | 090XXXXXXX | 12:46 AUG 10 |
| TANAKA ○○ | 090XXXXXXX | 12:28 AUG 10 |
| SAITO ○○ | 090XXXXXXX | 12:24 AUG 10 |
| HIGASIDA ○○ | 090XXXXXXX | 12:06 AUG 10 |
| KITAMURA ○○ | 090XXXXXXX | 11:04 AUG 10 |
| SAITO ○○ | 090XXXXXXX | 10:54 AUG 10 |

← DISPLAY REGISTRATION NAME IN PHONE BOOK

FIG. 6

| OUTGOING CALL HISTORY DATA | | |
|---|---|---|
| YOSHIDA ○○ | 090XXXXXXX | 12:15 AUG 10 |
| IMAIZUMI ○○ | 090XXXXXXX | 12:00 AUG 10 |
| YOSHIDA ○○ | 090XXXXXXX | 11:20 AUG 10 |
| TAMURA ○○ | 090XXXXXXX | 11:10 AUG 10 |
| TAMURA ○○ | 090XXXXXXX | 10:50 AUG 10 |
| HARADA ○○ | 090XXXXXXX | 10:15 AUG 10 |

| INCOMING CALL HISTORY DATA | | |
|---|---|---|
| TAKAHASHI ○○ | 090XXXXXXX | 13:00 AUG 10 |
| MURAOKA ○○ | 090XXXXXXX | 12:25 AUG 10 |
| MORINO ○○ | 090XXXXXXX | 11:45 AUG 10 |
| TAKAHASHI ○○ | 090XXXXXXX | 11:15 AUG 10 |
| OKADA ○○ | 090XXXXXXX | 11:10 AUG 10 |
| UEDA ○○ | 090XXXXXXX | 10:20 AUG 10 |

| MISSED INCOMING CALL HISTORY DATA | | |
|---|---|---|
| TANAKA ○○ | 090XXXXXXX | 12:28 AUG 10 |
| SAITO ○○ | 090XXXXXXX | 12:24 AUG 10 |
| HIGASHIDA ○○ | 090XXXXXXX | 12:06 AUG 10 |
| KITAMURA ○○ | 090XXXXXXX | 11:04 AUG 10 |
| SAITO ○○ | 090XXXXXXX | 10:54 AUG 10 |
| KOMURA ○○ | 090XXXXXXX | 10:24 AUG 10 |

| WHOLE CALL HISTORY DATA | | |
|---|---|---|
| TAKAHASHI ○○ | 090XXXXXXX | 13:00 AUG 10 |
| TANAKA ○○ | 090XXXXXXX | 12:28 AUG 10 |
| MURAOKA ○○ | 090XXXXXXX | 12:25 AUG 10 |
| SAITO ○○ | 090XXXXXXX | 12:24 AUG 10 |
| YOSHIDA ○○ | 090XXXXXXX | 12:15 AUG 10 |
| HIGASHIDA ○○ | 090XXXXXXX | 12:06 AUG 10 |
| IMAIZUMI ○○ | 090XXXXXXX | 12:00 AUG 10 |
| MORINO ○○ | 090XXXXXXX | 11:45 AUG 10 |
| TAKAHASHI ○○ | 090XXXXXXX | 11:15 AUG 10 |
| OKADA ○○ | 090XXXXXXX | 11:10 AUG 10 |

← NOT DISPLAY OUTGOING HISTORY DATA OVERLAPPED IN TELEPHONE NUMBER

| DESTINATION TELEPHONE NUMBER | OUTGOING CALL DATE AND TIME |
|---|---|
| 09000000005 | 17:25 MAY 10 |
| 09000000004 | 17:14 MAY 10 |
| 09000000003 | 17:12 MAY 10 |
| 09000000002 | 17:08 MAY 10 |
| 09000000001 | 17:01 MAY 10 |

} OUTGOING CALL HISTORY DATA AUTOMATICALLY TRANSFERRED FROM CELL PHONE

| DESTINATION TELEPHONE NUMBER | OUTGOING CALL DATE AND TIME |
|---|---|
| 09000000100 | 17:32 MAY 10 |
| 09000000005 | 17:25 MAY 10 |
| 09000000004 | 17:14 MAY 10 |
| 09000000003 | 17:12 MAY 10 |
| 09000000002 | 17:08 MAY 10 |

OUTGOING CALL HISTORY DATA OF NAVIGATION APPARATUS ITSELF

OUTGOING CALL HISTORY DATA AUTOMATICALLY TRANSFERRED FROM CELL PHONE

| SOURCE TELEPHONE NUMBER | INCOMING CALL DATE AND TIME |
|---|---|
| 09000000010 | 17:45 MAY 10 |
| 09000000009 | 17:20 MAY 10 |
| 09000000008 | 16:59 MAY 10 |
| 09000000007 | 16:52 MAY 10 |
| 09000000006 | 16:50 MAY 10 |

} INCOMING CALL HISTORY DATA AUTOMATICALLY TRANSFERRED FROM CELL PHONE

| SOURCE TELEPHONE NUMBER | INCOMING CALL DATE AND TIME |
|---|---|
| 09000000200 | 17:50 MAY 10 |
| 09000000010 | 17:45 MAY 10 |
| 09000000009 | 17:20 MAY 10 |
| 09000000008 | 16:59 MAY 10 |
| 09000000007 | 16:52 MAY 10 |

} INCOMING CALL HISTORY DATA OF NAVIGATION APPARATUS ITSELF

} INCOMING CALL HISTORY DATA AUTOMATICALLY TRANSFERRED FROM CELL PHONE

PRESS "HISTORY" BUTTON
PRESS "OUTGOING CALL HISTORY" BUTTON

PRESS "HISTORY" BUTTON
PRESS "INCOMING CALL HISTORY" BUTTON

↓ PRESS "PHONE BOOK" BUTTON

FIG. 14

| PHONE NUMBER | REGISTRATION NAME |
|---|---|
| 09000000001 | TANAKA ○○ |
| 09000000002 | ITOH ○○ |
| 09000000005 | NAKANO ○○ |
| 09000000006 | YAMADA ○○ |
| 09000000007 | SIZUKI ○○ |
| 09000000009 | SATOU ○○ |
| ⋮ | ⋮ |

PRESS "HISTORY" BUTTON
PRESS "INCOMING CALL HISTORY" BUTTON

IN-VEHICLE HANDSFREE APPARATUS AND DATA TRANSFER METHOD

CROSS-REFERENCE TO RELATED APPLICATIONS

The present application, a 371 U.S. National Stage of International Application No. PCT/2007/073652, filed Dec. 7, 2007, is based on and incorporates herein by reference Japanese Patent Applications as follows:
No. 2006-331875 filed on Dec. 8, 2006;
No. 2007-118937 filed on Apr. 27, 2007;
No. 2007-229467 filed on Sep. 4, 2007; and
No. 2007-312290 filed on Dec. 3, 2007.

TECHNICAL FIELD

The present invention relates to an in-vehicle handsfree apparatus and a data transfer method, which are for establishing a communication link with a cellular phone, which is in a short range communication area.

BACKGROUND

There is a configuration in which a cellular phone automatically transfers phone book data indicating correspondence between phone numbers and registration names to an in-vehicle handsfree apparatus. In such a configuration, for example, a user gets in the vehicle while carrying the cellular phone. When the cellular phone enters the short range communication area of the in-vehicle handsfree apparatus, a communication link is established between the cellular phone and the in-vehicle handsfree apparatus. The cellular phone thereby transfers the phone book data automatically to the in-vehicle handsfree apparatus. Under such a configuration, by operating the in-vehicle handsfree apparatus, the user is enabled to select a desired telephone number from the phone book data of the cellular phone and transmit the selected one (for example, refer to Patent document 1).
[Patent document 1] JP 2002-193046 A In contrast, there is studied a cellular phone to specify an automatic transfer of outgoing call history data or incoming call history data as well as an automatic transfer of the phone book data. For example, with respect to Bluetooth (registered trademark), a new profile (PBAP) is studied for responding to transmission of the phone book data, outgoing call history data, and incoming call history data to the in-vehicle handsfree apparatus in addition to a handsfree profile (HFP) for performing an incoming call or outgoing call in the in-vehicle handsfree apparatus.

DISCLOSER OF INVENTION

It is an object of the present invention to simplify a process in an in-vehicle handsfree apparatus and improve connectivity between an in-vehicle handsfree apparatus and any type of cellular phone in case where at least one of outgoing call history data, incoming call history data, and phone book data is transmitted to the in-vehicle handsfree apparatus from the cellular phone.

In order to achieve the above object, a first example of the present invention is characterized by comprising a control means and an outgoing call history storage means. The control means communicates with a cellular phone with a transfer protocol for realizing transfer of the outgoing call history data stored in the cellular phone before being connected using a handsfree protocol with the cellular phone, receives the outgoing call history data from the cellular phone, disconnects the communication using the transfer protocol after the receiving, and connects communication with a handsfree protocol for realizing a handsfree phone call by the cellular phone after the disconnecting. The outgoing call history data storage means stores the received outgoing call history data.

A second example of the present invention is characterized by comprising the following means. A transfer protocol control means executes communication using a transfer protocol for realizing transfer of the outgoing call history data stored in the cellular phone before the connection of the handsfree protocol when the cellular phone exists in a wireless connection area. An outgoing call history data reception means receives outgoing call history data from the cellular phone via the communication using the transfer protocol. A transfer protocol disconnection means disconnects the connected communication using the transfer protocol after the receiving. A handsfree protocol control means connects automatically communication using a handsfree protocol for realizing a handsfree phone call by the cellular phone after the disconnecting. An outgoing call history data storage means stores the outgoing call history data which is received.

A third example of the present invention is characterized by comprising a control means and an incoming call history data storage means. The control means communicates with a cellular phone with a transfer protocol for realizing transfer of the incoming call history data stored in the cellular phone before being connected using a handsfree protocol with the cellular phone, receives the incoming call history data from the cellular phone, disconnects, after receiving, the communication using the transfer protocol, and connects a communication using a handsfree protocol for realizing a handsfree phone call by the cellular phone after disconnecting. The incoming call history data storage means stores the incoming call history data which is received.

A fourth example of the present invention is characterized by the following means. A transfer protocol control means executes communication using a transfer protocol for realizing transfer of the incoming call history data stored in the cellular phone before the connection of the handsfree protocol when the cellular phone exists in a wireless connection area. An incoming call history data reception means receives incoming call history data from the cellular phone via the communication using the transfer protocol. A transfer protocol disconnection means disconnects the connected communication using the transfer protocol after the receiving. A handsfree protocol control means connects automatically communication using a handsfree protocol for realizing a handsfree phone call by the cellular phone after the disconnecting. An incoming call history data storage means stores the received incoming call history data.

A fifth example of the present invention is characterized by comprising by the following means. A transfer protocol control means performs a communication using the transfer protocol for realizing transfer of the incoming call history data, the outgoing call history data, and the phone book data stored in the cellular phone prior to the connection for the handsfree phone call when the cellular phone exists in a wireless connection area. A data reception means receives incoming call history data, outgoing call history data, and phone book data from the cellular phone via the communication using the transfer protocol. A transfer protocol disconnection means disconnects the connected communication using the transfer protocol after the receiving. A handsfree protocol control means connects automatically communication using a handsfree protocol for realizing a handsfree phone call by the cellular phone after the disconnecting. A data storage means stores the outgoing call history data, the incoming call history data, and the phone book data, which are received.

A sixth example of the present invention is characterized by comprising the following. A transfer protocol connecting step connects a transfer protocol between the cellular phone and the in-vehicle handsfree apparatus for realizing a transfer of the outgoing call history data, which was stored in the cellular phone before the connection for the handsfree phone call. An outgoing call history data receiving step receives the outgoing call history data via a communication connected at the transfer protocol connecting step. A disconnecting step automatically disconnects the communication using the transfer protocol after receiving the outgoing call history data. A handsfree connecting step automatically connects communication using the handsfree protocol for realizing the handsfree phone call by the cellular phone after the disconnecting at the disconnecting step.

A seventh example of the present invention is characterized by the following. A transfer protocol connecting step connects a transfer protocol between the cellular phone and the in-vehicle handsfree apparatus for realizing a transfer of the incoming call history data, which was stored in the cellular phone before the connection for the handsfree phone call. An incoming call history data receiving step receives the incoming call history data via a communication connected at the transfer protocol connecting step. A disconnecting step automatically disconnects the communication using the transfer protocol after receiving the incoming call history data. A handsfree connecting step automatically connects communication using the handsfree protocol for realizing the handsfree phone call by the cellular phone after the disconnecting at the disconnecting step.

Thus, after the data is transferred via the communication using the transfer protocol, the communication using the transfer protocol is disconnected and the communication using the handsfree protocol is then executed. As a result, it is unnecessary to connect the transfer protocol and the handsfree protocol at the same time. While the processing can be reduced in the in-vehicle handsfree apparatus, connectivity with the various types of cellular phones can be improved.

BRIEF EXPLANATION OF DRAWINGS

The above and other objects, features, and advantages of the present invention will become more apparent from the following detailed description made with reference to the accompanying drawings. In the drawings:

FIG. 3 is a diagram illustrating outgoing call history data;

FIG. 4 is a diagram illustrating incoming call history data;

FIG. 5 is a diagram illustrating missed incoming call history data;

FIG. 6 is a diagram illustrating outgoing call history data, incoming call history data, missed incoming call history data, and whole history data;

FIG. 14 is a diagram illustrating phone book data;

BEST MODE FOR ACHIEVING INVENTION

Figure 1:
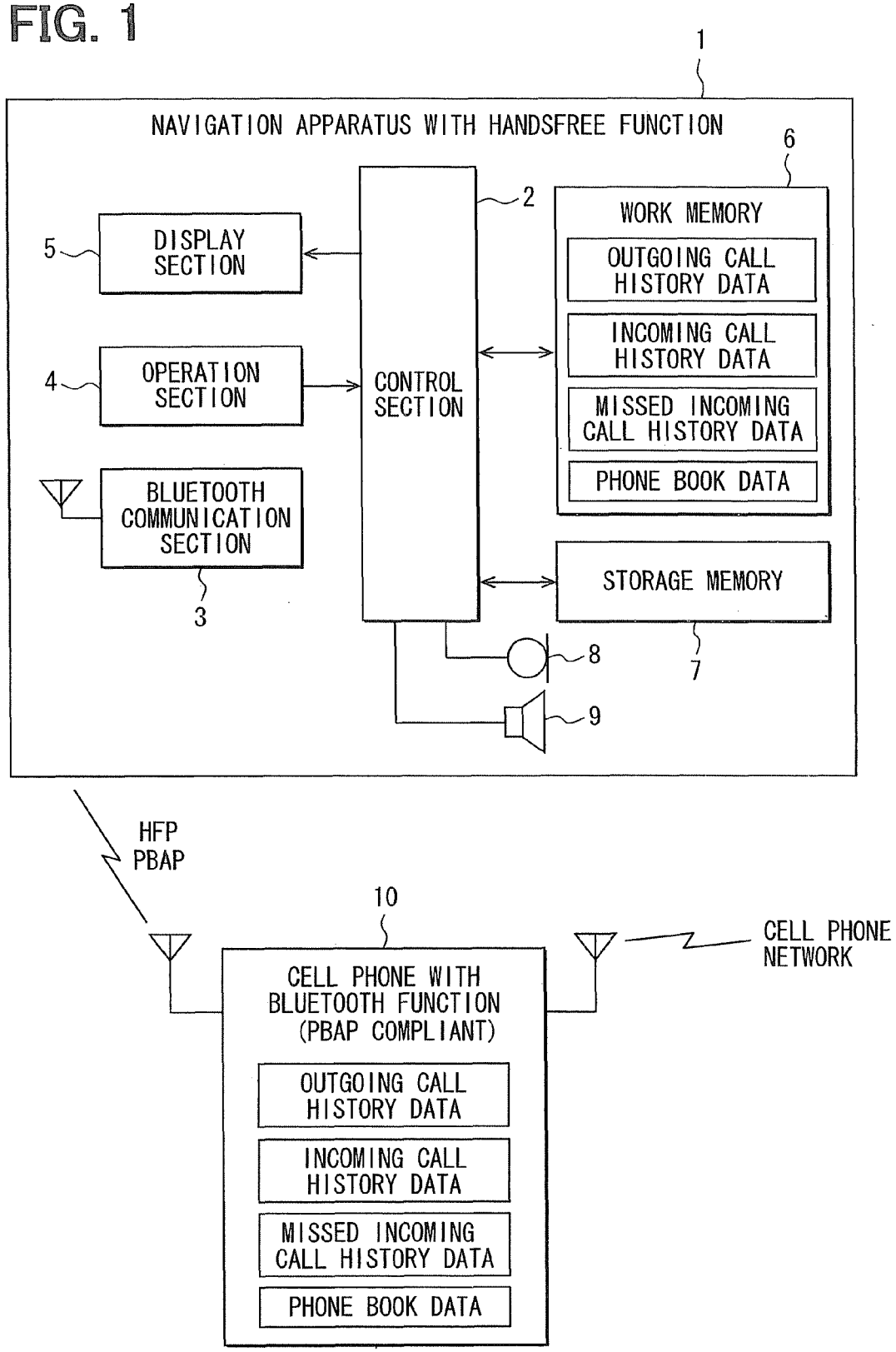
FIG. 1 is a functional block diagram of an embodiment of the present invention.

The present invention is explained with reference to drawings about an embodiment applied to an in-vehicle navigation apparatus with a handsfree function and a Bluetooth communication function. FIG. 1 indicates a functional block diagram of a main part of an in-vehicle navigation apparatus. The in-vehicle navigation apparatus 1 includes a control section 2, a Bluetooth communication section 3 (a short range communication means or unit), an operation section 4, a display section 5, a work memory 6, a storage memory 7, a microphone 8, and a speaker 9.

The control section 2 can function as a control means or unit, a determination means or unit, a display control means or unit, a transfer protocol control means or unit, a transfer protocol disconnection means or unit, a handsfree protocol control means or unit, an initial handsfree protocol communication means or unit, a communication maintenance means or unit, a phone book transfer setting means or unit, a data transfer designation means or unit, and a manual transfer protocol instruction means or unit. The control section 2 controls an overall operation such as communication operation and data control operation of the in-vehicle navigation apparatus 1. The Bluetooth communication section 3 can function as an outgoing call history data reception means or unit, an incoming call history data reception means or unit, and a data reception means or unit. If a cellular phone 10 with a Bluetooth communication function (hereinafter referred to as a cellular phone) is present within a Bluetooth wireless communication area, the Bluetooth communication section 3 establishes a wireless communication link with the cellular phones 10 in the Bluetooth wireless communication area and executes a communication compliant with a Bluetooth communication protocol. The cellular phone 10 responds to a Bluetooth system able to function, in particular, as a short range wireless communication means or a unit.

The Bluetooth communication section 3 of the present example is compliant with a known HFP (HandsFree Profile) for executing a handsfree phone call, and a PBAP (Phone Book Access Profile) for executing a transfer of phone book data and outgoing and incoming call history data.

Herein, the above profiles signify communication protocols defined for every function. In stand-alone, i.e., without connecting HFP with the in-vehicle navigation apparatus 1 as a handsfree apparatus, the cellular phone 10 establishes a cellular phone link with a base station (not shown) in a cellular phone network and performs independently an outgoing call process and incoming call process. Herein, the cellular phone 10 performs an outgoing call process for instance as follows. A user operates a dial key ("0" to "9" numerical keypad) (not shown), and inputs a destination telephone number of the calling destination. Then, when an outgoing call key (not shown) is operated, the telephone number as a calling destination is transmitted. The cellular phone 10 can thus perform a phone call with the cellular phone as the calling destination.

Further, the cellular phone 10 performs an incoming call process for instance as follows. In response to a cellular phone as a caller source transmitting a phone call to the cellular phone 10 as a calling destination, upon receiving an incoming call via the base station, the cellular phone 10 receives the source telephone number of the caller cellular phone via the base station. Then, when the user operates an acknowledge key (not shown), the cellular phone 10 can respond to the caller cellular phone and perform a phone call with the cellular phone as the caller source.

In addition, the cellular phone 10 has a clock section (not shown) which clocks dates and times (dates and clock times). In the above outgoing call process, one data item of correspondence is formed between the destination telephone number and outgoing call date and time. The destination telephone number is inputted via the dial key, whereas the outgoing call date and time is measured by the clock section. The multiple data items of correspondence constitute outgoing call history data, which is stored and held in the cellular phone 10. Further, in the above incoming call process, one data item of correspondence is formed between the source telephone number and incoming call date and time. The source telephone number is received via the base station, whereas the incoming call date and time is measured by the clock section. The multiple data items of correspondence constitute incoming call history data, which is stored and held in the cellular phone 10.

Furthermore, when not responding to an incoming call, one data item of correspondence is formed between the source telephone number and incoming call date and time. The source telephone number is received via the base station, whereas the incoming call date and time is measured by the clock section. The multiple data items of correspondence constitute missed incoming call history data, which is stored and held in the cellular phone 10. Furthermore, the cellular phone 10 holds phone book data, which include multiple data items, each data item of which has correspondence between a telephone number and a registration name. The phone book data is prepared as follows. A user inputs each telephone number and a corresponding registration name to thereby store, for instance, about 500 data items of the telephone numbers and registration names in association with each other in a non-volatile memory (not shown).

Herein, when the phone book data is held, the above registration names are included in the above outgoing call history data and incoming call history data. In detail, it is checked whether the source telephone number received from the base station is a telephone number, which is registered in the phone book data and in association with a registration name. When such a correspondence is confirmed in the phone book data, the corresponding incoming call history data comes to include the telephone number, incoming call date and time, and registration name. The missed incoming call history data also comes to include the telephone number, incoming call date and time, and registration name, via the similar processing. Further, with respect to the outgoing call history data, it is also checked whether a destination telephone number transmitted in the above outgoing call process is a telephone number registered in the phone number. When the correspondence is confirmed, the outgoing call history data comes to include the outgoing call date and time, destination telephone number, and registration name.

Thus, the user reads out the phone book data, and selects and call one telephone number to thereby securely perform an outgoing call process with a simple operation without need of inputting one by one the whole numerical keys corresponding to the numerals included in the telephone number. In addition, the cellular phone 10 can store, for instance, about newest 20 data items for each of the outgoing call history data, the incoming call history data, and the missed incoming call history data, respectively. Whenever any one of the outgoing call process, incoming call process, and missed incoming call occurs, the oldest data item is automatically eliminated. The outgoing call history data, incoming call history data, or missed incoming call history data are updated accordingly. It is noted that the cellular phone 10 is compliant with a known HFP for a handsfree phone call, and a PBAP for a phone book data transfer and outgoing/incoming call history data transfer.

When complying with PBAP which specifies automatic transfer of the outgoing/incoming call history data, the cellular phone 10 connects PBAP immediately after establishing a communication link with the Bluetooth communication section 3, and transfers automatically the phone book data, which is stored at that time. Furthermore, the outgoing call history data, incoming call history data, and missed incoming call history data, which are stored at that time are transferred automatically. Thus, when the in-vehicle navigation apparatus 1 exists within the Bluetooth communication area, the cellular phone 10 automatically transfers the outgoing history data which are stored up to 20 data items based on the outgoing call processes performed in the past by the cellular phone 10 itself, the incoming history data which are stored up to 20 data items based on the incoming call processes performed in the past by the cellular phone 10 itself, and the missed incoming history data which are stored up to 20 data items based on the missed incoming call processes performed in the past by the cellular phone 10 itself.

Figure 11A:
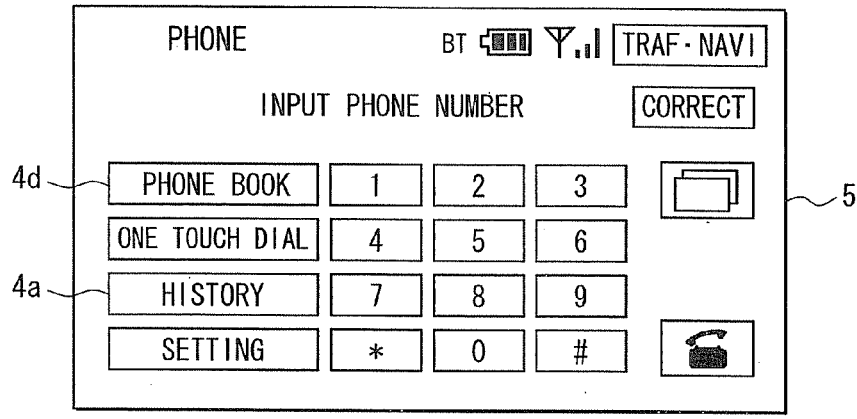
FIG. 11 is a diagram illustrating changes of a display window when executing an outgoing call operation using outgoing call history.

The operation section 4 may function as an operation means or unit for a user to operate it. For example, the operation section 4 includes a touch key formed in the display section 5. The operation section 4 detects a user's operation to thereby output a corresponding operation signal to the control section 2. The display section 5 may function as a display means or unit. The display section 5 displays a display window based on a display signal inputted from the control section 2. As illustrated in FIG. 11 (a) and FIG. 12 (a), for example, the display window illustrating dial keys arranged to correspond to "0" to "9" is displayed for the user to input a telephone number.

The work memory 6 may function as an outgoing call history data storage means or unit, an incoming call history data storage means or unit, and a data storage means or unit and includes a volatile memory. The work memory 6 stores the outgoing call history data, incoming call history data, missed incoming call history data, and phone book data, which were transferred automatically from the cellular phone 10 without any user's operation. Note that the work memory 6 can store each of the outgoing call history data, incoming call history data, and missed incoming call history data, for instance, up to five data items, respectively. The storage memory 7 includes a nonvolatile memory and stores the various data.

When the user performs a display demand of the outgoing call history data via the operation section 4, the control section 2 causes the display section 5 to display the outgoing call history data stored in the work memory 6. When the user performs a display demand of the incoming call history data via the operation section 4, the control section 2 causes the display section 5 to display the incoming call history data stored in the work memory 6. When the user performs a display demand of the phone book data via the operation section 4, the control section 2 causes the display section 5 to display the phone book data stored in the work memory 6. In addition, as explained above, in the in-vehicle navigation apparatus 1 of the present embodiment, the number of data items of the outgoing call history data or the number of data items of the incoming call history data stored in the work memory 6 is five, respectively. The maximum number of data items displayed in the display section 5 is also five for each data (refer to FIGS. 11 (b), (c), and FIG. 12 (b) and (c)).

The microphone 8 functions as an audio input means or unit for inputting sounds. When executing a handsfree phone call using the cellular phone 10, sounds uttered by the user are inputted to the microphone 8. The speaker 9 functions as an audio output means or unit. When executing a handsfree phone call using the cellular phone 10, reception sounds of the other party are outputted via the speaker 9. That is, when the Bluetooth communication link is established between the Bluetooth communication section 3 and cellular phone 10, and, then, the wireless communication using HFP is connected, the control section 2 causes the Bluetooth communication section 3 to transmit the sound inputted via the microphone 8 to the cellular phone 10. While causing the cellular phone 10 to transmit to the cellular phone network, the Bluetooth communication section 3 is caused to receive sounds from the cellular phone network and output it via the speaker 9.

The in-vehicle navigation apparatus 1 further includes, in addition to the functional blocks illustrated in the drawing, the following functional blocks required for navigation operation: a GPS device as a present position detector to detect a present position of the vehicle; a route retrieval section to retrieve a route from a present position to a destination; a map data reading section to read map data from a storage medium which stores map data; a VICS (registered trademark) reception section to receive VICS information distributed from the VICS center; and a speech recognition section to speech recognize sounds uttered by a user.

In such a configuration, the in-vehicle navigation apparatus 1 extracts GPS date information which the GPS device receives from the GPS satellite to thereby acquire date and time, which is used as outgoing call date and time or incoming call date and time. In addition, the date and time extracted from the GPS date information is absolute date and time, which has very high accuracy.

The above-mentioned in-vehicle navigation apparatus 1 is configured to start or stop in conjunction with the ACC (accessory) switch starting or stopping. The ACC switch is used to turn ON or OFF the power supply to the vehicular apparatuses. When the ACC switch changes from the ON state to the OFF state based on the user's operation, the power supply is stopped to thereby switch the power source of the apparatuses from the ON state to the OFF state. In such an event, the data, which was previously stored in the storage memory 7, is held without being deleted, while the outgoing call history data, incoming call history data, missed incoming call history data, and phone book data, which were previously stored in the work memory 6, are deleted.

An operation under the above configuration is explained with reference to FIGS. 2 to 16. Herein, the followings are assumed. The cellular phone 10 already holds (stores) the outgoing call history data up to 20 data items in maximum, the incoming call history data up to 20 data items in maximum, and the missed incoming call history data up to 20 data items in maximum. Further, a user, who carries the cellular phone 10, approaches the vehicle, and gets in the vehicle; then, the above ACC switch is turned ON, thereby causing the cellular phone 10 to enter the Bluetooth communication area of the in-vehicle navigation apparatus 1.

Figure 2:
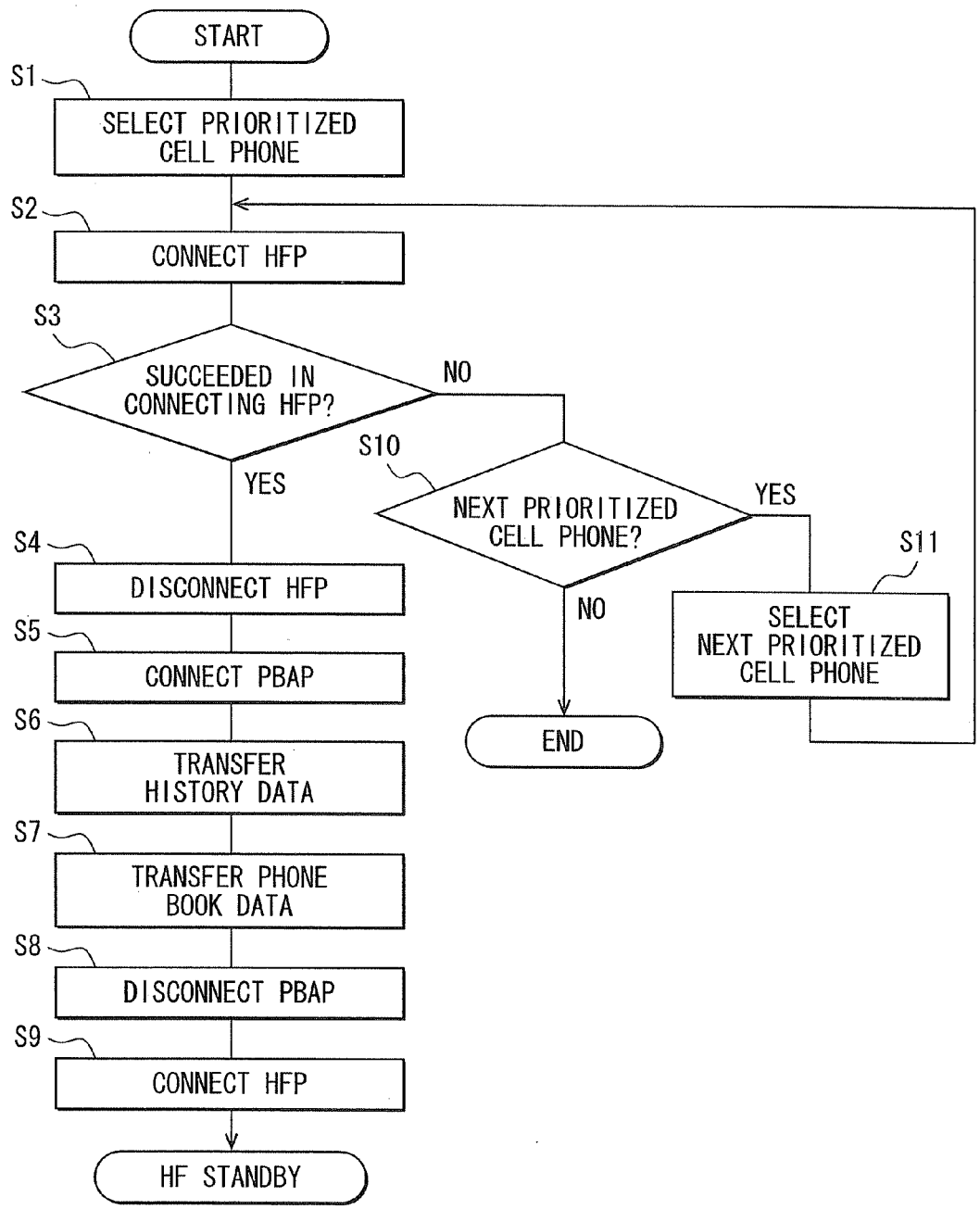
FIG. 2 is a flowchart (part 1)
Figure 7:
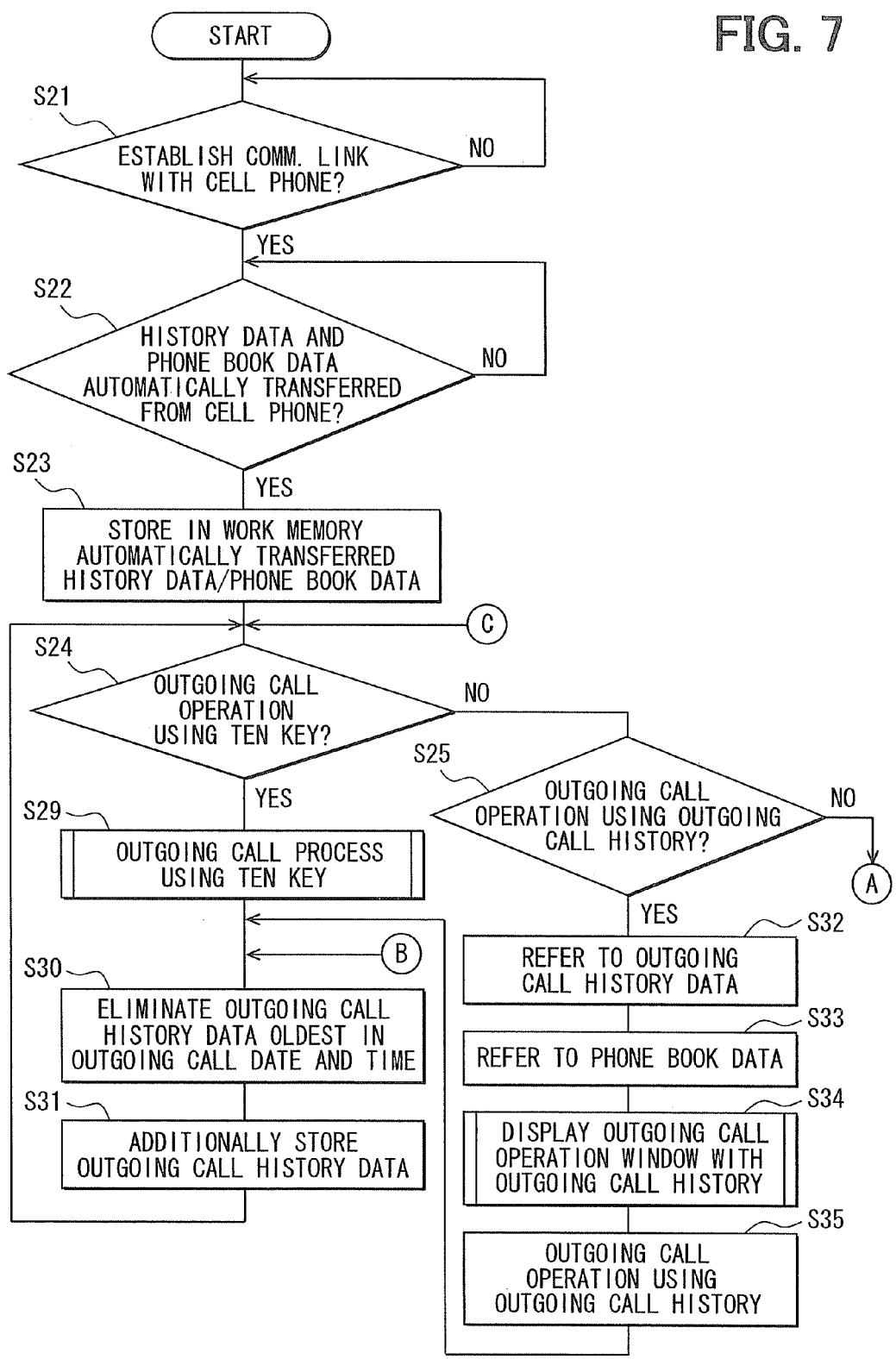
FIG. 7 is a flowchart (part 2)
Figure 8:
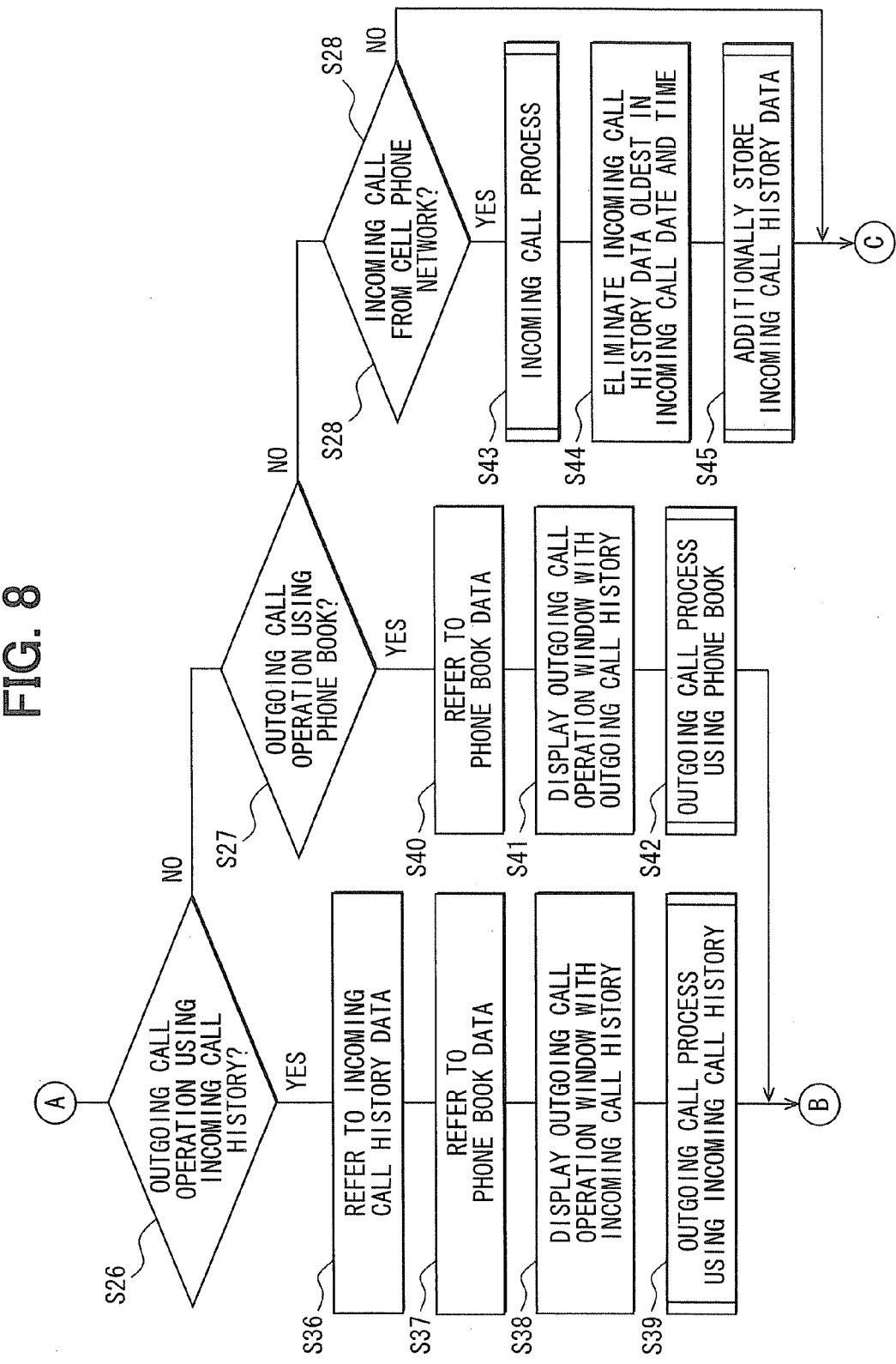
FIG. 8 is a flowchart (part 3)

First, the following explains with reference to FIG. 2 a procedure in which the control section 2 of the in-vehicle navigation apparatus 1 receives outgoing call history data, incoming call history data, missed incoming call history data, and phone book data from the cellular phone 10. In addition, the user registers previously the cellular phone 10 which serves as a communication partner of the in-vehicle navigation apparatus 1 in the Bluetooth communication. For example, a password of four digits is entered for every cellular phone at the time of an initial communication setting; then, the in-vehicle navigation apparatus 1 or the cellular phone 10 generates a link key known to only each other and the generated key is stored and registered in the both. At an initial connection, the link key is required to undergo an authentication process, thereby allowing the selection of the cellular phone which should be connected. That is, an unregistered cellular phone is not allowed to perform the communication connection using HFP and the communication connection using PBAP. Basically, a cellular phone of the user of the vehicle is previously registered to thereby be allowed to perform the wireless communication using HFP and the wireless communication using PBAP.

In the present example, multiple cellular phones 10 as communication connection targets are registered in the in-vehicle navigation apparatus 1 and previously assigned with priority orders using the operation section 4. The control section 2 stores the priority orders. This is because, for example, a driver may have multiple cellular phones.

The following is also assumed in the present example. The Bluetooth communication section 3 of the in-vehicle navigation apparatus 1 is compliant with both protocols for the wireless communication using HFP and the wireless communication using PBAP; further, both the protocols can be simultaneously connected, which is referred to as multi-profile connection. However, any process for the simultaneous connection dare not be used in the present example. This results from the main three reasons as follows: (1) A cellular phone 10 as a communication partner is assumed to be compliant with the wireless communication using HFP and the wireless communication using PBAP like the in-vehicle navigation apparatus 1, but not compliant with the simultaneous connection. (2) A cellular phone 10 as a communication partner is assumed to be compliant with the wireless communication using HFP and the wireless communication using PBAP like the in-vehicle navigation apparatus 1, and, further compliant with the simultaneous connection. However, in order to maintain the simultaneous connection, the software process by the Bluetooth communication section 3 of the in-vehicle navigation apparatus 1 becomes complicated, thereby posing a concern about the stability of the communication connection. (3) The in-vehicle navigation apparatus 1 is required to connect with any one of cellular phones 10 compliant with the wireless communication connection using HFP and the wireless communication connection using PBAP manufactured by many makers in the world.

For the above reasons, the in-vehicle navigation apparatus 1 of the present example is provided as follows. In order to eliminate the simultaneous connection of the wireless communication in HFP and the wireless communication in PBAP as much as possible, a serial connection is adopted such that the wireless communication in HFP and the wireless communication in PBAP time-share each other as the more reliable procedure for the wireless communication in HFP and wireless communication in PBAP.

Returning to the explanation, the control section 2 selects a cellular phone 10 having the high priority order as a communication connection target in the wireless communication in HFP (Step 51). Note that, in the present example, without executing the communication connection in PBAP, first of all, an initial communication in HFP is tried automatically to thereby start the connection. The reason is mentioned later.

Next, the control section 2 connects an initial communication in HFP automatically with the selected cellular phone 10

(Step S2). It is determined whether the wireless communication connection in HFP is successfully established (Step S3). When the control section 2 determines that the wireless communication connection in HFP is successfully established ("YES" at Step S3), the wireless communication in the connected HFP is immediately disconnected automatically (Step S4). The control section 2 connects the wireless communication in PBAP automatically with the cellular phone 10, with which the wireless communication connection in HFP was successfully established (Step S5).

Subsequently, the control section 2 transmits a data transfer demand for the cellular phone 10 to start a transfer process of outgoing call history data, incoming call history data, and missed incoming call history data (Step S6). As the transfer process of the outgoing call history data, incoming call history data, and missed incoming call history data is performed, the in-vehicle handsfree apparatus 1 receives the data (Step S6). After the transfer process ends, the control section 2 transmits a transfer demand for the cellular phone 10 to perform a transfer process of phone book data, and the in-vehicle handsfree apparatus 1 then receives the data (Step S7). When the transfer process of the phone book data ends, the wireless communication in the connected PBAP is disconnected (Step S8).

The control section 2 connects again the wireless communication in HFP automatically with the cellular phone 10, with which the wireless communication in PBAP was disconnected (Step S9), then advancing to a handsfree standby process. Thus, in the present example, the wireless communication is serially changed automatically in an order of HFP->PBAP->HFP. Thus, it becomes possible that a secure communication process takes place stably with cellular phones, which are manufactured by many manufactures and compliant with the wireless communication in HFP and the wireless communication in PBAP; it is unnecessary to complicate the software process in the in-vehicle navigation apparatus 1.

In contrast, when the control section 2 determines that the wireless communication connection in HFP is not successfully established ("NO" at Step S3), it is determined whether a cellular phone 10 having the next high priority order is present (Step S10). When it is determined that a cellular phone 10 having the next high priority order is present ("YES" at Step S10), the control section 2 selects the cellular phone 10 having the next high priority order as a communication connection target (Step S11). The processing then returns to Step S2 and is repeated like the above.

Herein, the control section 2 operates in the above-mentioned transfer process of the outgoing call history data, incoming call history data, and missed incoming call history data as follows. With respect to the outgoing call history data, as illustrated in FIG. 3 (a), the control section 2 receives the outgoing call history data which contains registration names, destination telephone numbers, and outgoing call dates and times, from the cellular phone 10 and stores the received data in the work memory 6. With respect to the incoming call history data, as illustrated in FIG. 4 (a), the control section 2 receives the incoming call history data which contains registration names, source telephone numbers, and incoming call dates and times, from the cellular phone 10 and stores the received data in the work memory 6. With respect to the missed incoming call history data, as illustrated in FIG. 5 (a), the control section 2 receives the missed incoming call history data which contains registration names, source telephone numbers, and missed incoming call dates and times, from the cellular phone 10 and stores the received data in the work memory 6.

Thereafter when a display demand occurs with respect to the outgoing call history data, incoming call history data, and missed incoming call history data, the control section 2 causes the display section 5 to display the outgoing call history data, incoming call history data, and missed incoming call history data, which are stored in the work memory 6. That is, without reading the registration name from the phone book data stored in the work memory 6, the registration name, which was transmitted from the cellular phone 10, is displayed in the display section 5.

When the wireless communication connection in HFP is established at Step S9 by the control section 2, it becomes possible that the operation section 4 of the in-vehicle navigation apparatus 1 can execute an outgoing call process and incoming call process. After receiving the outgoing call history data, incoming call history data, and missed incoming call history data from the cellular phone 10 (after the wireless communication connection in HFP is established at S9), the control section 2 executes a new outgoing call process, new incoming call process, and new missed incoming call process through an operation of the operation section 4. Thereafter when a display demand occurs with respect to the outgoing call history data, incoming call history data, and missed incoming call history data, the control section 2 searches the phone book data, which was transmitted from the cellular phone 10, for a registration name corresponding a destination telephone number of an outgoing call process, a source telephone number of an incoming call process, or a source telephone number of a missed incoming call process. When the corresponding registration name exists in the phone book data, the registration name is displayed in the display section 5 (refer to FIG. 3 (c), FIG. 4 (c), and FIG. 5 (c)).

That is, in cases that a new outgoing call process is carried out to Mr. Oomori's telephone number, when Mr. Oomori's registration name is already registered in the phone book data, the control section 2 reads out the registration name of "Oomori OO" from the phone book data and displays the outgoing call history data including the registration name of "Oomori OO" in the display section 5. In contrast, in cases that a new incoming call process is carried out from Mr. Yamaoka's telephone number, when Mr. Yamaoka's registration name is already registered in the phone book data, the control section 2 reads out the registration name of "Yamaoka OO" from the phone book data and displays the incoming call history data including the registration name of "Yamaoka OO" in the display section 5. With respect to a missed incoming call, the control section 2 reads out the registration name of "Kaneda OO" from the phone book data and displays the missed incoming call history data including the registration name of "Kaneda OO" in the display section 5.

In addition, a display demand of whole history data may arise which demands the whole history data containing the outgoing call history data, incoming call history data, and missed incoming call history data to be displayed in an order of date and time from the newest one. In such cases, with respect to the incoming call history data and missed incoming call history data, regardless of whether the incoming telephone number or the missed incoming telephone number is identical to (overlapped with) another telephone number, the control section 2 selects a predetermined number of telephone numbers from the newest one in the incoming call date and time or missed incoming call date and time from all of the incoming call history data and the missed incoming call history data and displays the selected ones. In contrast, with respect to the outgoing call history data, the control section 2 selects to display only the newest data item among the data items having an identical source telephone number (refer to FIG. 6).

That is, since the source telephone numbers of "Yoshida OO" overlap in the present embodiment, the control section 2 displays only the data item of the outgoing call history data having the newest outgoing call date and time of 12:15 on August 10.

Next, the following explains, with reference to FIGS. 7 to 16, a procedure in which the control section 2 of the in-vehicle navigation apparatus 1 receives from the cellular phone 10 the outgoing call history data, incoming call history data, missed incoming call history data, and phone book data, stores the received ones, and then performs an outgoing call using the stored outgoing call history data, incoming call history data, and missed incoming call history data. In addition, although the following explains the procedure pertinent to the outgoing call history data and the incoming call history data, the procedure pertinent to the missed incoming call history data is similar.

In the in-vehicle navigation apparatus 1, the control section 2 determines that a cellular phone 10 exists in the Bluetooth communication area of the in-vehicle navigation apparatus 1 and the Bluetooth communication section 3 established the communication link with the cellular phone 10 ("YES" at Step S21). The control section 2 then waits for automatic transfer of the outgoing call history data, incoming call history data, and phone book data from the cellular phone 10 to the Bluetooth communication section 3 (Step S22).

When the control section 2 determines that the outgoing call history data, incoming call history data, and phone book data were automatically transferred from the cellular phone 10 ("YES" at Step S22), the control section 2 stores in the work memory 6 the outgoing call history data, incoming call history data, and phone book data, which were transferred automatically from the cellular phone 10 (Step S23).

More specifically, the number of data items of the outgoing call history data or incoming call history data transferred automatically the cellular phone 10 is 20, respectively, while the number of data items of the outgoing call history data or incoming call history data storable in the work memory 6 is five, respectively. Thus, the number of data items of the outgoing call history data or incoming call history data storable in the work memory 6 is less than the number of data items of the outgoing call history data or incoming call history data transferred automatically from the cellular phone 10, thereby requiring the following process.

That is, with respect to the outgoing call history data, the control section 2 cancels a data item having an old outgoing call date and time among those of the outgoing call history data transferred automatically from the cellular phone 10 to thereby store in the work memory 6 preferentially the data items having the newest outgoing call dates and times from those of the outgoing call history data transferred automatically from the cellular phone 10. Further, with respect to the incoming call history data, similar to the outgoing call history data, the control section 2 cancels a data item having an old incoming call date and time among those of the incoming call history data transferred automatically from the cellular phone 10 to thereby store in the work memory 6 preferentially the data items having the newest incoming call dates and times from those of the incoming call history data transferred automatically from the cellular phone 10.

Figure 11B:
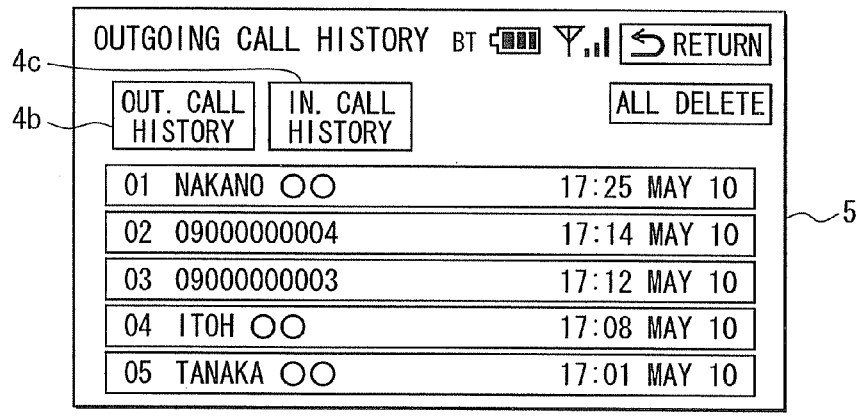
Figure 11C:
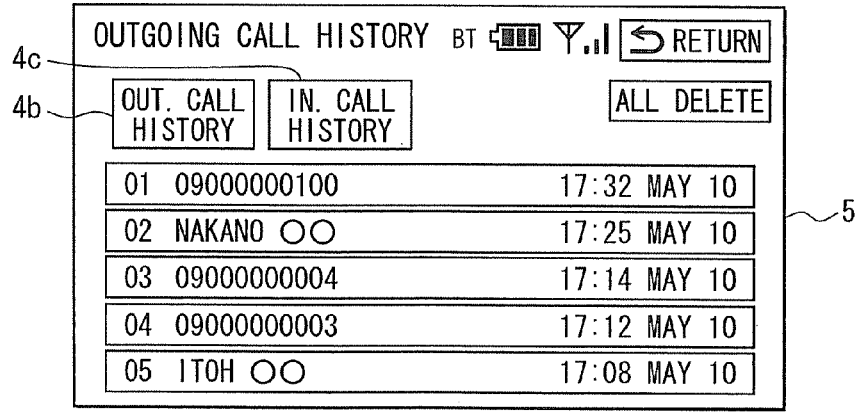
Figure 12A:
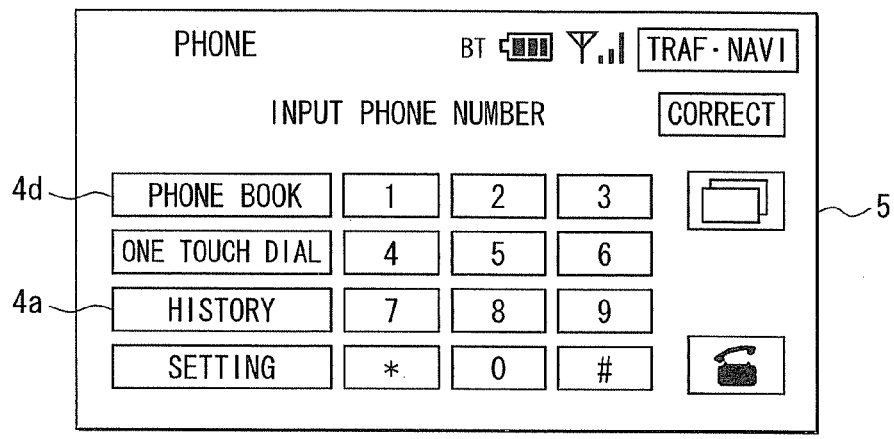
FIG. 12 is a diagram illustrating changes of a display window when executing an outgoing call operation using incoming call history.
Figure 12B:
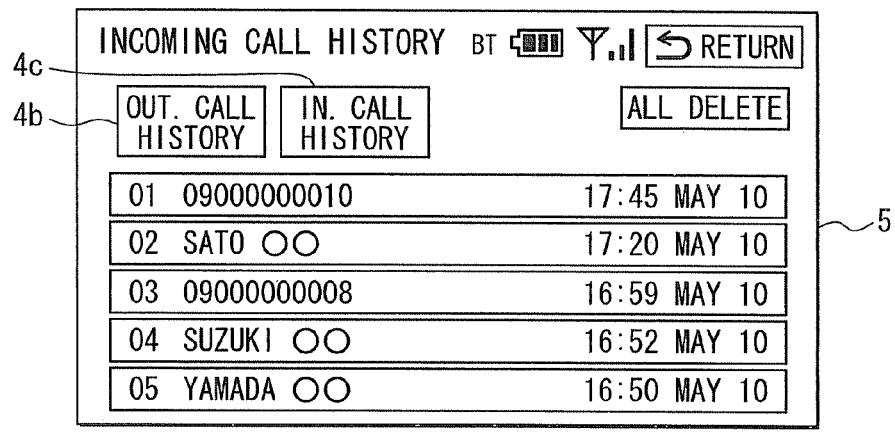
Figure 12C:
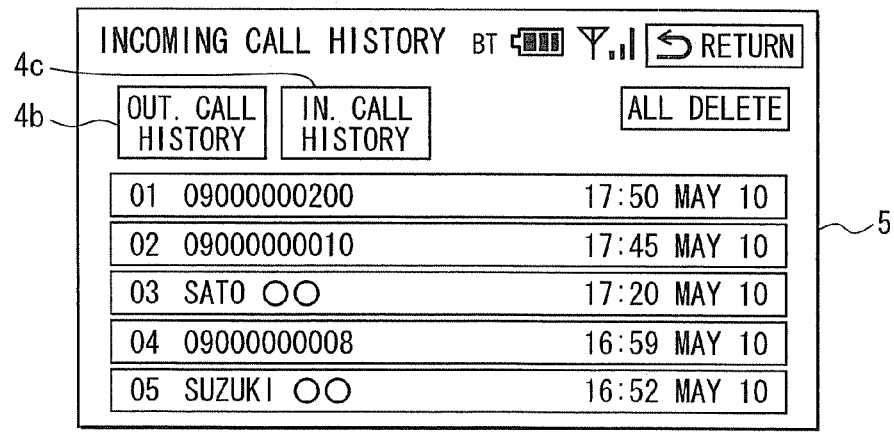

That is, immediately after the outgoing call history data is automatically transferred from the cellular phone 10, the control section 2 holds the outgoing call history data illustrated in FIG. 9 (*a*) as the outgoing call history data in the work memory 6. When the user then performs an operation to display the outgoing call history data, the control section 2 displays a display window in the display section 5, as illustrated in FIG. 11 (*b*). Further, immediately after the incoming call history data is automatically transferred from the cellular phone 10, the control section 2 holds the incoming call history data illustrated in FIG. 10 (*a*) as the incoming call history data in the work memory 6. When the user then performs an operation to display the incoming call history data, the control section 2 displays a display window in the display section 5, as illustrated in FIG. 12 (*b*).

Thus, when the cellular phone 10 and the in-vehicle navigation apparatus 1 establish the Bluetooth communication link therebetween, the outgoing call history data and incoming call history data, which are stored before the cellular phone 10 establishes the Bluetooth communication link, are transmitted automatically to the work memory 6 of the in-vehicle navigation apparatus 1. The cellular phone 10 and the in-vehicle navigation apparatus 1 thus configure a single phone system, allowing a user to perform a handsfree phone call. After the cellular phone 10 and in-vehicle navigation apparatus 1 have configured the single phone system, the user is allowed to perform an outgoing call operation by selecting one of the dial key input, the outgoing call history, incoming call history, and phone book. It becomes possible to stand by an incoming call from the cellular phone network.

The present example adopts as a Bluetooth communication procedure a serial profile switching, which executes, in order, connecting the wireless communication in PBAP at S5-->disconnecting the wireless communication connection in PBAP at S8->connecting the wireless communication connection in HFP at S9. Accordingly, after the wireless communication in HFP is connected at S9, a new incoming call may arrive at the cellular phone 10 or a new outgoing call process may be performed via the operation section 4. In such cases, the cellular phone 10 eventually stores in its own memory the incoming history data and outgoing call history data, which include the above new incoming and outgoing calls. Therefore, in order to acquire the updated outgoing and incoming call history data from the cellular phone 10, the control section 2 of the in-vehicle navigation apparatus 1 can perform the wireless communication in PBAP (simultaneous connection) during the wireless communication in HFP.

In contrast, in view of trying to prevent the simultaneous connection as much as possible, a serial connection may be adopted which disconnects the wireless communication in HFP and connects the wireless communication in PBAP. However, in the serial connection, the cellular phone 10 and the in-vehicle navigation apparatus 1, both of which configure the single phone system, is substantively separated from each other, thereby causing a state where a handsfree phone call cannot be allowed. Therefore, in the present example, after the wireless communication connection in HFP is established at S9, while thereafter maintaining only the wireless communication connection in HFP, the in-vehicle navigation apparatus 1 obtains the newest outgoing and incoming call history data from itself and maintains it without help of the cellular phone 10. Such a feature is explained below.

The control section 2 determines whether the user executes an outgoing call operation via the dial key input (Step S24). The control section 2 determines whether the user executes an outgoing call operation using the outgoing call history (Step S25). The control section 2 determines whether the user executes an outgoing call operation using the incoming call history (Step S26). The control section 2 determines whether the user executes an outgoing call operation using the phone book (Step S27). The control section 2 determines whether an incoming call arrives from the cellular phone network (Step S28).

Figures 9A, 9B:
FIG. 9 is a diagram comparable with FIG. 3.
Figures 10A, 10B:
FIG. 10 is a diagram comparable with FIG. 4.

When the control section 2 determines that the user executes an outgoing call operation via the dial key input ("YES" at Step S24), the control section 2 performs an outgoing call process while regarding the telephone number inputted by the user via the dial key as a destination telephone number (Step S29). When the control section 2 completes the outgoing call process via the dial key input, as illustrated in FIG. 9(b), the control section 2 deletes a data item having the oldest in the outgoing call date and time among the outgoing call history data stored at that time in the work memory 6 (Step S30). The control section 2 stores additionally the newest data item of the outgoing call as self outgoing call history data in the work memory 6 (Step S31).

When the user inputs, for example, the telephone number "09000000100" by operating the dial key and performs an outgoing call while regarding the telephone number "09000000100" as a destination telephone number, the control section 2 stores additionally the data item of the outgoing call history data representing the telephone number "09000000100" as the self outgoing call history data in the work memory 6 as illustrated in FIG. 9(b). Further, the control section 2 stores as a time stamp the date and time obtained via the GPS device of the in-vehicle navigation apparatus 1 as an outgoing call date and time corresponding to the telephone number "09000000100."

That is, in FIG. 9 (b), the outgoing call date and time of the newest telephone number "09000000100" is the time which the GPS device of the in-vehicle navigation apparatus 1 acquired, while other outgoing call dates and times of the four remaining telephone numbers are the times which the clock device of the cellular phone 10 acquired. Further, when the user then performs an operation to display the outgoing call history data, the control section 2 displays a display window in the display section 5, as illustrated in FIG. 11 (c).

When the user presses "HISTORY" button 4a and then "OUTGOING CALL HISTORY" button 4b, the control section 2 determines that the user performs an outgoing call operation using the outgoing call history ("YES" at Step S25). The control section 2 refers to the outgoing call history data stored in the work memory 6 (Step S32). The control section 2 refers to the phone book data stored in the work memory 6 (Step S33). As illustrated in FIGS. 11(b), 11(c), the control section 2 displays an outgoing call operation window using the outgoing call history in the display section 5 (Step S34). If the destination telephone number of the outgoing call history data is registered in the phone book data, the registration name corresponding to the telephone number is displayed in the display section 5 by the control section 2. In contrast, if the destination telephone number of the outgoing call history data is not registered in the phone book data, the telephone number is displayed in the display section 5.

Subsequently, the control section 2 executes an outgoing call process that performs an outgoing call while regarding as the destination telephone number the telephone number the user selected from the telephone numbers displayed in the display section 5 (Step S35). When the control section 2 completes the outgoing call process using the outgoing call history, the control section 2 similarly deletes a data item having the oldest in the outgoing call date and time among the outgoing call history data stored at that time in the work memory 6 (Step S30). The control section 2 stores additionally the newest data item of the outgoing call using the outgoing call history as self outgoing call history data in the work memory 6 (Step S31). Further, the control section 2 stores as a time stamp the date and time obtained via the GPS device of the in-vehicle navigation apparatus 1 as an outgoing call date and time corresponding to the destination telephone number.

When the user presses "HISTORY" button 4a and then "INCOMING CALL HISTORY" button 4c, the control section 2 determines that the user performs an incoming call operation using the outgoing call history ("YES" at Step S26). The control section 2 refers to the incoming call history data stored in the work memory 6 (Step S36). The control section 2 refers to the phone book data stored in the work memory 6 (Step S37). As illustrated in FIGS. 12(b), (c), the control section 2 displays an outgoing call operation window using the incoming call history in the display section 5 (Step S38). If the destination telephone number of the incoming call history data is registered in the phone book data, the registration name corresponding to the telephone number is displayed in the display section 5 by the control section 2. In contrast, if the destination telephone number of the incoming call history data is not registered in the phone book data, the telephone number is displayed in the display section 5.

Subsequently, the control section 2 executes an outgoing call process that perform an outgoing call while regarding as the destination telephone number the telephone number the user selected from the telephone numbers displayed in the display section 5 (Step S39). When the control section 2 completes the outgoing call process using the incoming call history, also in this case, the control section 2 deletes a data item having the oldest in the outgoing call date and time among the outgoing call history data stored at that time in the work memory 6 (Step S30). The control section 2 stores additionally the newest data item of the outgoing call using the incoming call history as self outgoing call history data in the work memory 6 (Step S31). Further, the control section 2 stores as a time stamp the date and time obtained via the GPS device of the in-vehicle navigation apparatus 1 as an outgoing call date and time corresponding to the destination telephone number.

Figure 13A:
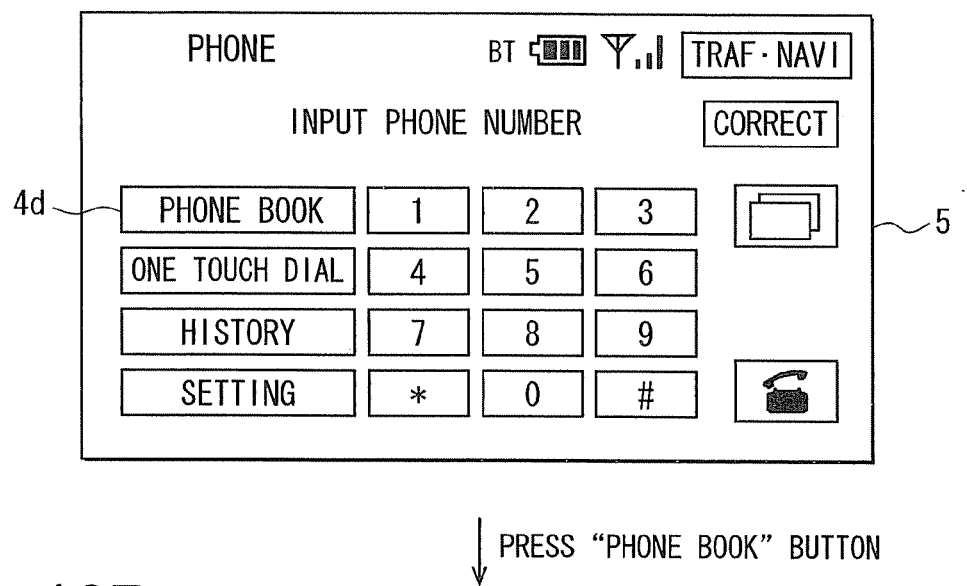
FIG. 13 is a diagram illustrating changes of a display window when executing an outgoing call operation using phone book.
Figure 13B:
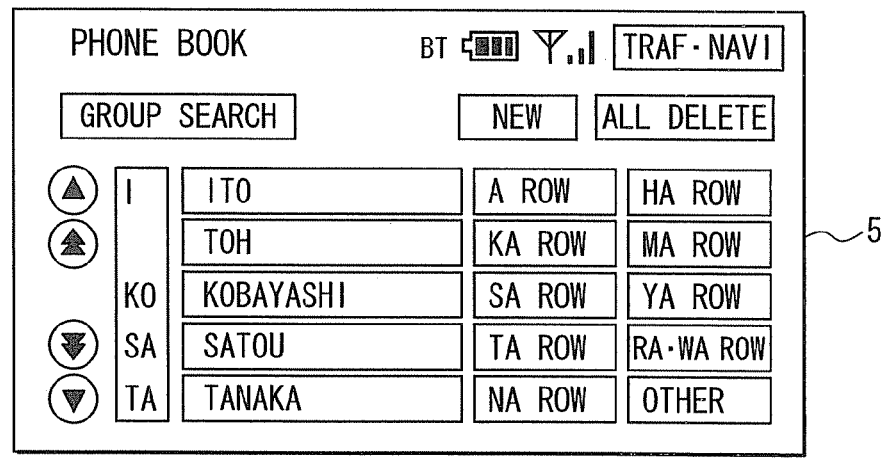
Figure 15:
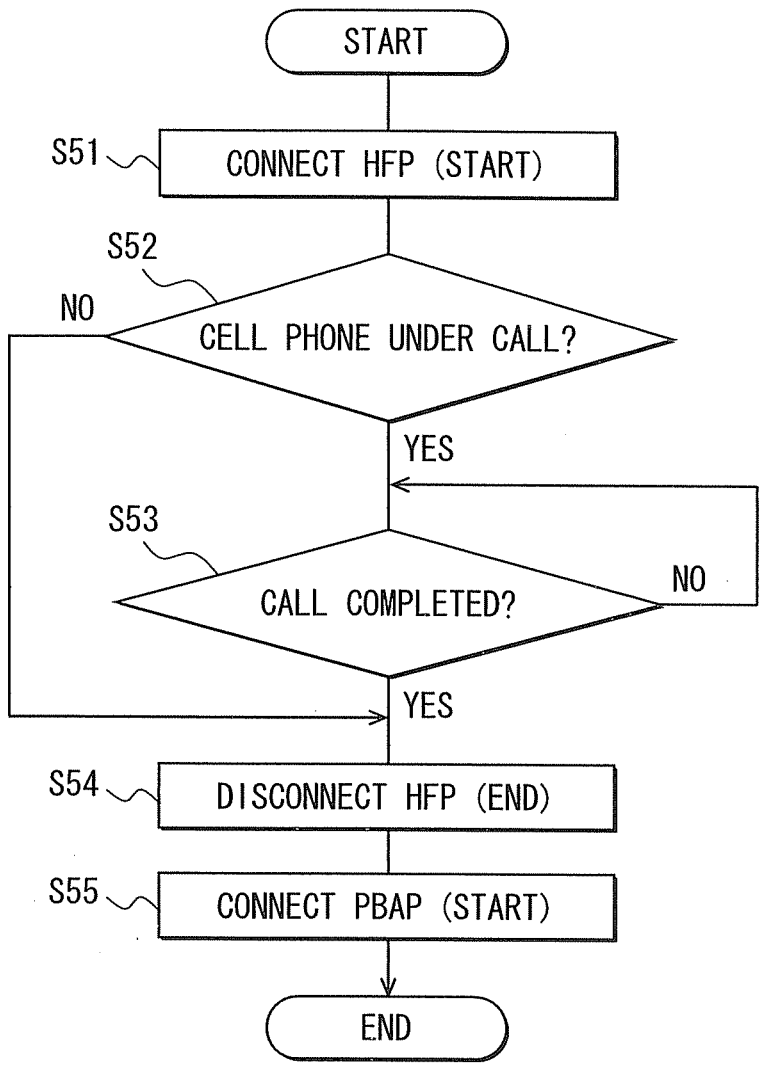
FIG. 15 is a flowchart (part 4)

When the user presses "PHONE BOOK" button 4d, the control section 2 determines that the user performs an outgoing call operation using the phone book ("YES" at Step S27). The control section 2 refers to the phone book data stored in the work memory 6 (Step S40). As illustrated in FIG. 13(b), the control section 2 displays an outgoing call operation window using the phone book in the display section 5 (Step S41). Subsequently, the control section 2 executes an outgoing call process that performs an outgoing call while regarding as the destination telephone number the telephone number the user selected from the telephone numbers displayed in the display section 5 (Step S42). When the control section 2 completes the outgoing call process using the phone book, the control section 2 similarly deletes a data item having the oldest in the outgoing call date and time among the outgoing call history data stored at that time in the work memory 6 (Step S30). The control section 2 stores additionally the newest data item of the outgoing call using the phone book as self outgoing call history data in the work memory 6 (Step S31). Further, the control section 2 stores as a time stamp the date and time obtained via the GPS device of the in-vehicle navigation apparatus 1 as an outgoing call date and time corresponding to the destination telephone number.

When the control section 2 determines via the communication section 3 that the cellular phone 2 receives an incoming call from the cellular phone network ("YES" at Step S28), the control section 2 performs an incoming call process for the notification or the like to notify of the incoming call (Step S43). When the incoming call process is completed, the control section 2 deletes a data item having the oldest in the incoming call date and time among the incoming call history data stored at that time in the work memory 6 (Step S44). The control section 2 stores additionally the newest data item of the incoming call representing that incoming call, as self incoming call history data in the work memory 6 (Step S45).

That is, when the control section 2 receives via the Bluetooth communication section 3 the telephone number "09000000200" from the cellular phone network as the incoming telephone number, the control section 2 stores additionally the data item of the incoming call history data representing the telephone number "09000000200" as the self incoming call history data in the work memory 6.

Thus, even if the wireless communication connection in PBAP is not performed after the wireless communication connection in HFP at S9, when a new incoming call process or a new outgoing call process occurs after S9, the self outgoing and incoming call history data is added and displayed for the user. As a result, it is not necessary to execute simultaneous connection of HFP and PBAP. After the HFP wireless communication connection at S9, it is unnecessary to disconnect the wireless communication in HFP and connect the wireless communication in PBAP. Thus, it can prevent a substantive separation of the cellular phone 10 and the in-vehicle navigation apparatus 1, which constitute the independent phone system.

Next, the following explains the display process of the outgoing and incoming call history data which were received in the wireless communication in PBAP, and the outgoing and incoming call history data generated in the outgoing and incoming call process arising after S9.

In the HFP wireless connection state started at S9, the cellular phone 10 transmits an incoming telephone number to the in-vehicle navigation apparatus 1 when receiving the incoming call. At this time, an incoming call data and time is not simultaneously transmitted. Therefore, the control section 2 stores as a time stamp the date and time obtained via the GPS device of the in-vehicle navigation apparatus 1 as an incoming call date and time corresponding to the telephone number "09000000200." That is, in FIG. 10 (*b*), the incoming call date and time of the newest telephone number "09000000200" is the time which the GPS device of the in-vehicle navigation apparatus 1 acquired, while other incoming call dates and times of the four other telephone numbers are the times which the clock device of the cellular phone 10 acquired. Further, when the user then performs an operation to display the incoming call history data, the control section 2 displays a display window in the display section 5, as illustrated in FIG. 12 (*c*).

The foregoing explained the following. The number of data items of the outgoing call history data or incoming call history data storable in the work memory 6 is less than the number of data items of the outgoing call history data or incoming call history data transferred automatically from the cellular phone 10. The data item having an old outgoing call date and time or old incoming call date and time is cancelled from among those of the outgoing call history data or incoming call history data transferred automatically from the cellular phone 10. The data item having a new outgoing call date and time or a new incoming call date and time is preferentially stored in the work memory 6 from among those of the outgoing call history data or incoming call history data transferred automatically from the cellular phone 10. In contrast, when connecting the wireless communication in PBAP, the number of data items automatically transmitted may be specified (five data items in the present embodiment) by the in-vehicle navigation apparatus 1 to the cellular phone 10. Thereby, the data item having a new outgoing call date and time or incoming call date and time may be preferentially stored in the work memory 6.

In the above-mentioned configuration, the following is explained in the in-vehicle navigation apparatus 1. When a new outgoing call process or new incoming call process is performed, the oldest data item of the outgoing call history data or incoming call history data is erased among the outgoing call history data or incoming call history data which are stored in the work memory 6. In contrast, from the user's viewpoint, since there are requirements, the control section 2 may execute another process indicated in the following substitute process, which is needed when the wireless communication connection in PBAP is no longer performed after S9 like the present example.

That is, when the time which the clock device of the cellular phone 10 counts is compared with the time which the GPS device of the in-vehicle navigation apparatus 1 acquires, the time which the clock device of the cellular phone 10 counts sometimes has more errors and less accurate than the time which the GPS apparatus acquires. In addition, the time which the clock device of the cellular phone 10 counts can be set by the user: thus, the time may be set intentionally by the user to be proceeded or conversely delayed by a predetermined time period (for example, 10 minutes).

Thus, the following are supposed. The user sets up time of the cellular phone 10 by proceeding a predetermined time period temporarily; thus, the in-vehicle navigation apparatus 1 stores the set time in the work memory 6. Under such state, rearrangement in order of time is applied to the outgoing call history data and incoming history data which were transferred automatically from the cellular phone 10 and outgoing call history data and incoming history data of the in-vehicle navigation apparatus 1 itself. Accordingly, in spite of being the newest on the time-axis, the outgoing call history data or incoming history data resulting from the new outgoing call process or new incoming call process in the in-vehicle navigation apparatus 1 is displayed on the columns in the display window of the list display (for example, the second, third column) other than the uppermost column without being displayed on the column uppermost. This involves the gap between the time-axis which the user memorizes, and the time-axis which the display section 5 displays, therefore providing the user with the sense of incongruity.

To respond to such discrepancy, the control section 2 displays the outgoing call history data or incoming history data, which were transferred automatically from the cellular phone 10, by arranging them in order of time on the columns other than the uppermost column, while displays the new outgoing call history data or the new incoming call history data of the navigation apparatus 1 itself by arranging them on the uppermost column. This allows the display to harmonize with the time-axis which the user memorizes, thereby helping prevent the user from holding sense of incongruity.

Further, when displaying the outgoing call history data or incoming call history data, which are transferred automatically from the cellular phone 10 in order of dates and times, the control section 2 may not always need to rearrange the outgoing call history data or incoming call history data using the date and time data. That is, if the outgoing call history data or incoming call history data have data of an order of outgoing calls or incoming calls, the outgoing call history data or incoming call history data may be displayed based on the order of outgoing calls or incoming calls.

In addition, the order data of the outgoing calls or incoming calls may not be explicitly contained. The data may be transmitted in the list form shown in FIG. 3 (*a*), FIG. 4 (*a*), and FIG. 5 (*a*) from the cellular phone 10 and received by the in-vehicle navigation apparatus 1. In such instance, the data may be displayed based on the rule that the higher order corresponds to the newer data. That is, the cellular phone 10 transmits the data in the format that the actual order of outgoing calls or incoming calls are distinguishable in the in-vehicle navigation apparatus 1.

For example, in the cellular phone 10, an incoming call arriving at 12 o'clock zero minutes zero seconds (12:00:00) from Mr. A and an incoming call arriving at 12 o'clock zero minutes thirty seconds (12:00:30) from Mr. B may be time stamped identically as twelve o'clock zero minutes (12:00) if minutes are used as end units of counting instead of seconds. Such time stamped data are stored as the incoming call history data in the cellular phone 10. When receiving such data, the in-vehicle navigation apparatus 1 tries to rearrange the data in order of time, but cannot determine the order of time. Accordingly, it is desirable that the cellular phone 10 assigns data with the order data of outgoing calls or incoming calls or the above list form. This allows the display to harmonize with the time-axis which the user memorizes, thereby helping prevent the user from holding sense of incongruity.

In this case, the date and time data contained in the outgoing call history data or incoming call history data is treated as adjunctive data, while the above-mentioned order data of the outgoing calls or incoming calls serve as the user's actual order of the outgoing calls or incoming calls. In addition, the cellular phone 10 itself repeats the incoming call process and outgoing call process independently without cooperating with the in-vehicle navigation apparatus 1. Thus, the cellular phone 10 can recognize the order of outgoing or incoming calls, thus managing the outgoing or incoming call history according to the correct order. Accordingly, the cellular phone 10 assigns calls with the order data of the outgoing calls or the incoming calls without being influenced by the outgoing or incoming call date and time by the clock device of the cellular phone 10 and transmits them to the in-vehicle navigation apparatus 1. Upon receiving them, the in-vehicle navigation apparatus 1 processes to arrange the outgoing or incoming call history data based on the order data of the outgoing or incoming calls. Alternatively, without assigning the order data of the outgoing or incoming calls, the cellular phone 10 may prepare the above list by determining the actual order and transmit them to the in-vehicle navigation apparatus 1. The in-vehicle navigation apparatus 1 may process to arrange the data in the actual order of the outgoing or incoming calls by following the above rule.

The above can respond to the following case. It may be assumed that the clock of the cellular phone 10 is set to gain or delay at a certain time. When an outgoing or incoming call arises immediately thereafter, the outgoing or incoming call history data is displayed in the actual order, whereas the order of the dates and times attached to the outgoing or incoming call history data is different from the displayed order. Therefore, when such outgoing or incoming call history data are rearranged on the basis of dates and times of the outgoing or incoming call history data by the in-vehicle navigation apparatus 1, the rearranged data are displayed in an order different from the actual order. Accordingly, in order to arrange data in the actual order, the technique of using the order data of the outgoing or incoming calls or the technique of using the list form may be desirable for arranging the data in the actual outgoing or incoming order.

As a result, the control section 2 can display the data in the display section 5 in the actual order of the outgoing or incoming calls having occurred in the cellular phone 10. After executing such data processing in the in-vehicle navigation apparatus 1, the following takes place. As described above, the outgoing call process may be performed using the dial key input of the in-vehicle navigation apparatus 1, using the outgoing call history, using the incoming call history, or using the phone book data. Among the outgoing call history data stored in the work memory 6 at that time, the data being oldest or regarded as being oldest in the order data of the outgoing calls is erased. The newest data item of the outgoing call, which indicates an outgoing call using the outgoing call history in the in-vehicle navigation apparatus 1 itself, is stored additionally as self outgoing call history data in the work memory 6. In contrast, when a new incoming call process arises, the control section 2 erases the data being oldest or regarded as being oldest in the order data of the incoming calls among the incoming call history data stored in the work memory 6 at that time. The newest data item of the incoming call, which indicates an incoming call using the incoming call history in the in-vehicle navigation apparatus 1 itself, is stored additionally as self incoming call history data in the work memory 6.

In the above outgoing call process or incoming call process, the control section 2 stores as a time stamp the date and time obtained via the GPS device of the in-vehicle navigation apparatus 1 as an outgoing call date and time corresponding to the destination telephone number or an incoming call date and time corresponding to the source telephone number. This allows the display to harmonize with the time-axis which the user memorizes, thereby helping prevent the user from holding sense of incongruity.

More specifically, in case where there is a display demand of the whole history data collecting the outgoing call history data and incoming call history data, the control section 2 needs a predetermined sorting process compared with the case when displaying only either the above outgoing call history data or incoming call history data. As mentioned above, the cellular phone 10 may transmit the incoming call history data or outgoing call history data such that the newest order can be recognized by being accompanied by the order data of the outgoing or incoming calls in the actual time-axis. Alternatively, the cellular phone 10 may transmit the data as a list form not including the order data. In such cases, the in-vehicle navigation apparatus 1 displays the data in order notified as it is as mentioned above, without being based on the outgoing call date and time or incoming call date and time. In the case of displaying only either the incoming call history or outgoing call history, the data can be displayed in an order matching with that displayed in the cellular phone 10.

However, when displaying the whole history data, the following problems arise. The in-vehicle navigation apparatus 1 can securely recognize the newest one among the outgoing calls or the newest one among the incoming calls; however, the in-vehicle navigation apparatus 1 cannot actually recognize the newer one among both the newest ones. Accordingly, in the present example, when displaying all the history data, the dates and times included in the outgoing call history data and the incoming call history data are compared with each other, the newer one is eventually displayed as the newest one. For example, with respect to five data items of the incoming call history data and the five data items of the outgoing call history data, those ten data items are displayed by being resorted in order of date and time. Thus, in almost the cases, the outgoing call history data and incoming call history data can be displayed in the actual time-axis of the user. In contrast, when the time stamp function in the cellular phone 10 is up to "minute," an incoming call arriving from Mr. A at 12 o'clock zero minutes zero second (12:00:00) and an outgoing call transmitting to Mr. B at 12 o'clock zero minutes thirty seconds (12:00:30) are time stamped as identical twelve o'clock zero minutes (12:00). The in-vehicle navigation apparatus 1 therefore needs a predetermined display rearrangement of an outgoing call treated as being newer than the incoming call or vice versa.

In addition, when the newest order of the three data items (A-C) of the incoming call history data received by the wireless communication in PBAP can be recognized as mentioned above, and, furthermore, the newest order of the data items (D-F) of the outgoing call history data received by PBAP can be recognized, the dates and times of the outgoing call history data and incoming call history data are compared with each other as follows to thereby execute the rearrangement.

First, the dates and times of A and D are compared and the newer one is regarded as the first (for example, A). Next, the date and time of B is compared with that of D and the newer one is regarded as the second (for example, B). Next, the dates and times of C and D are compared and the newer one is regarded as the third (for example, D). Next, the date and time of C is compared with that of E and the newer one is regarded as the second (for example, C). Next, with respect to E and F, since E is the newest, the fifth is assigned to E and the sixth is assigned to F. When the dates and times compared with each other are identical, rearrangement is made according to a predetermined rule, prioritizing the date and time of an outgoing call to an incoming call, or vice versa.

In addition, when transmitting the phone book data, the cellular phone 10 needs to transform its data format to "vCard" format specified by the Bluetooth communication standard specification. Further, the phone book data is apt to be updated less frequently than the outgoing call history data or incoming call history data. Thus, the control section 2 receives preferentially the outgoing call history data and incoming call history data, and then receives the phone book data via the Bluetooth communication section 3 from the cellular phone 10. In addition, the control section 2 receives the outgoing call history data and incoming call history data via the Bluetooth communication section 3 from the cellular phone 10; then, only when the user executes a predetermined operation via the operation section 4, the phone book data may be received via the Bluetooth communication section 3 from the cellular phone 10.

In addition, whether to transmit the phone book data based on the user's operation or automatically may be designated by the user selecting either in the in-vehicle navigation apparatus 1, thereby performing the transfer process according to the user's designation. Under the condition that setting to the automatic transfer is designated as "not transfer," after the HFP wireless communication connection at S9, a user's manual transfer operation may be made to transmit only the phone book data. Accordingly, the wireless communication connection in HFP at S9 is disconnected by the manual transfer operation, and the wireless communication connection in PBAP is made. As the data transfer is completed, the wireless communication in HFP is again connected with the cellular phone 10, thereby switching to the state allowing the handsfree phone call.

When setting to "not transfer," the outgoing call history data and incoming call history data having the higher update frequency can be received preferentially compared to the phone book data having the lower update frequency. In addition, while no data format conversion is required to transmit the outgoing call history data or incoming call history data, the data format conversion is required to the phone book data. Accordingly, the outgoing call history data and incoming call history data having a shorter transfer time can be received preferentially compared to the phone book data having a longer transfer time. The data volume to be transmitted can be reduced by transmitting only the outgoing call history data and incoming call history data. As a result, since the communication by the transfer protocol can be executed promptly and the communication by the subsequent handsfree protocol can be executed promptly. Thus, the time up to the execution of the handsfree phone call can be shortened when the cellular phone is brought in the vehicle. Furthermore, it can be selected as needed whether to receive the phone book data, which needs a long transfer time and has a low update frequency, improving the usability.

When the phone book data is transmitted by the above user's manual transfer operation as needed, the communication in HFP is automatically executed after the transfer is completed. When performing an outgoing call using the phone book data, the handsfree phone call can be possible, enhancing the usability. Further, when the phone book data is transferred based on the manual transfer operation, only the phone book data can be stored in the nonvolatile storage memory 7. The stored data can be read from the storage memory 7 at the time of next boot-up of the in-vehicle navigation apparatus 1 and used as the phone book data.

In addition, the control section 2 may store in the work memory 6 the outgoing call history data, incoming call history data, and phone book data, which were received from the cellular phones 10, such that the data for each of the cellular phones 10 is distinguished from the other. In such a case, the control section 2 associates the data stored in the work memory 6 with each cellular phone 10, for example, as follows. When the control section 2 stores in the work memory 6 the outgoing call history data, incoming call history data, and phone book data, which were received from the cellular phone 10, a link key is generated based on a cellular phone ID and an apparatus ID and the generated link key is stored in the work memory 6 in association with the various data. More specifically, the cellular phone ID is uniquely given to the cellular phone 10 and received from the cellular phone 10, while the apparatus ID is uniquely given to the in-vehicle handsfree apparatus 1. When receiving a cellular phone ID from the cellular phone 10 thereafter, the control section 2 re-generates a link key based on the received cellular phone ID and the apparatus ID, and updates the various data stored in the work memory 6 in association with the generated link key.

Next, the HFP process at S2 is explained in detail. The connection of HFP and PBAP at S2 is controlled according to the flowchart illustrated in FIG. 15. That is, when the control section 2 determines that a communication link is established with a cellular phone 10 existing in the Bluetooth communication area, the control section 2 connects (starts) the wireless communication in HFP (Step S51). The control section 2 determines whether the cellular phone 2 is during a phone call state or not (Step S52). More specifically, whether the cellular phone 10 is during a phone call state or during a standby state is notified by the wireless communication in HFP. Upon receiving the state of the cellular phone 10, the in-vehicle navigation apparatus 1 determines it according to the received communication state. More specifically, S51 corresponds to the processing at S2.

When the control section 2 determines that the cellular phone 10 is not during a phone call state, namely the cellular phone 10 is during the standby state ("NO" at Step S52), the connected wireless communication in HFP is disconnected (ended) (Step S54). The wireless communication in PBAP is connected (Step S55). That is, if the cellular phone 10 is not in a phone call state, the control section 2 immediately disconnects the connected wireless communication in HFP automatically and then connects the wireless communication in PBAP automatically. Thus, the control section 2 causes the Bluetooth communication section 3 to receive the outgoing call history data, incoming call history data, and phone book data transmitted from the cellular phone 10.

In contrast, when the control section 2 determines that the cellular phone 10 is in the phone call state ("YES" at S52), the control section 2 maintains the wireless communication in HFP while assuming that the handsfree phone call using the in-vehicle navigation apparatus 1 may be executed. More specifically, whether the phone call is executed is basically dependent on the cellular phone 10. If the wireless communication in HFP is connected while the cellular phone 10 is in the phone call state, the reception sound may be transmitted to the Bluetooth communication section 3 automatically or based on an operation to the cellular phone 10.

Subsequently, the control section 2 determines whether the cellular phone 10 completes the phone call (Step S53). When it is determined that the cellular phone 20 completes the phone call ("YES" at Step S53), the connected wireless communication in HFP is disconnected (ended) (Step S54). The wireless communication in PBAP is connected (Step S55). If the cellular phone 10 is in a phone call state, the control section 2 disconnects the connected wireless communication in HFP after the phone call ends, and then connects the wireless communication in PBAP. After the user completes the handsfree phone call, the control section 2 causes the Bluetooth communication section 3 to receive the outgoing call history data, incoming call history data, and phone book data transmitted from the cellular phone 10. More specifically, S52, S53 correspond to the processing between S3 and S4.

Thus, when the cellular phone 10 is connected to the in-vehicle navigation apparatus 1, It is determined whether the cellular phone 10 is in a phone call. If it is in the phone call state, switching to the wireless communication in PBAP prevents the cellular phone 10 from moving to the handsfree phone call. Thus, the wireless communication in HFP is maintained and wireless communication connection in PBAP is not executed during the phone call. When it is determined that the phone call is completed, the wireless communication in HFP is disconnected and the wireless communication connection in PBAP is executed. As a result, when the cellular phone 10 is in the phone call state independently, it becomes possible for the cellular phone 10 to change to the handsfree phone call smoothly.

Figure 16A:
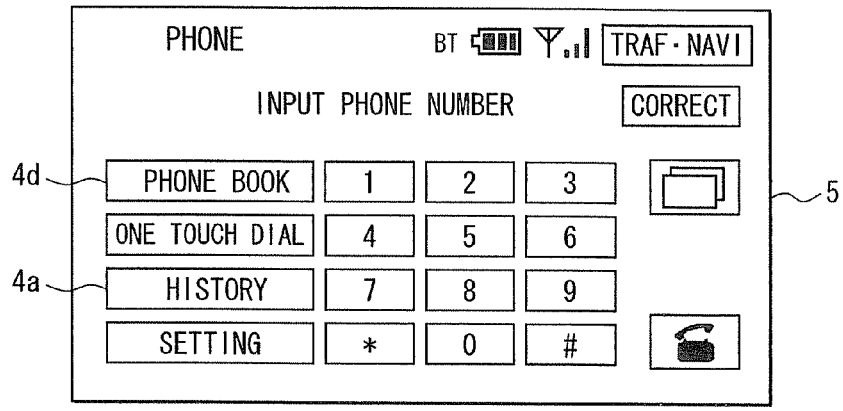
FIG. 16 is a diagram comparable with FIG. 12.
Figure 16B:
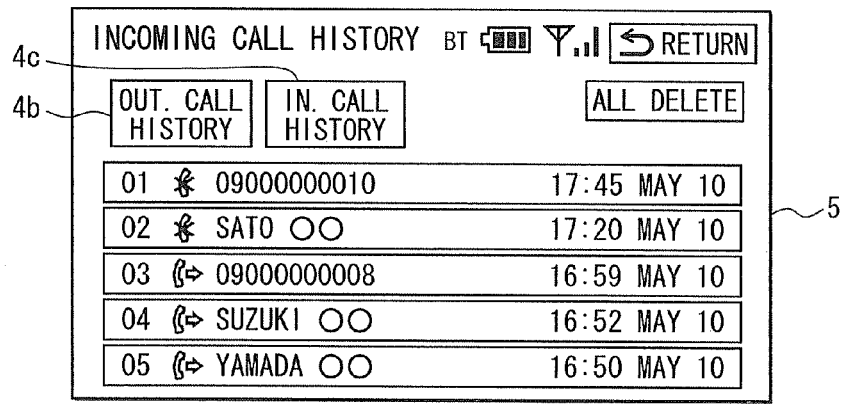
Figure 16C:
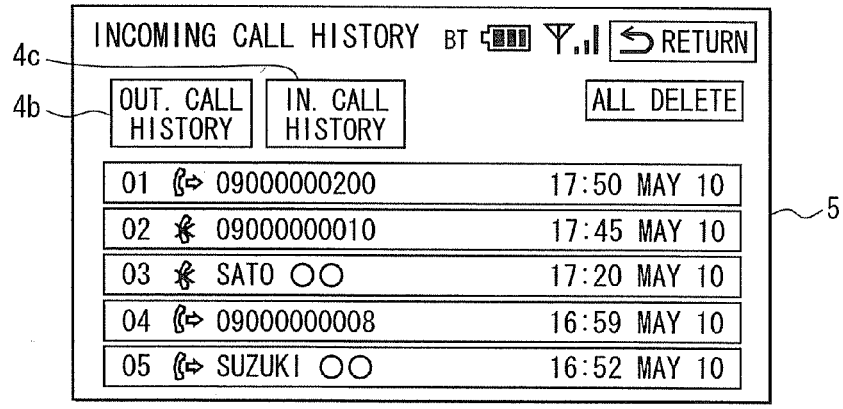

Further, the control section 2 may store the incoming call history data while distinguishing a responded incoming call history by the cellular phone 10 and a not-responded incoming call history (missed incoming call history) by the cellular phone 10 from each other. In such cases, the following may be operated. When the user presses "HISTORY" button 4a and then "INCOMING CALL HISTORY" button 4c, the control section 2 determines that an outgoing call operation using the incoming call history is performed. The control section 2 then refers to the incoming call history data stored in the work memory 6 and refers to the phone book data stored in the work memory 6. The outgoing call operation window is thereby displayed in the display section 5 as illustrated in FIGS. 16 (b) and (c). More specifically, the window displays, with respect to each data item, either an icon graphic showing an incoming call which is responded (figure having a combination of a telephone receiver and an arrow) or an icon graphic showing an incoming call (missed incoming call) which is not responded (figure having a combination of a telephone receiver and x mark).

The above explains the case that the control section 2 stores in the work memory 6 the outgoing call history data, incoming call history data, and phone book data, which were transferred from the cellular phone 10, or the case that only the phone book data is stored in the storage memory 7. In contrast, the control section 2 may store in the storage memory 7 the outgoing call history data, incoming call history data, and phone book data, which were transferred from the cellular phone 10. In such a configuration, even if the power source of the apparatus is turned off, the outgoing call history data, incoming call history data, and phone book data which are stored in the storage memory 7 can be continuously stored.

As explained above, the present embodiment can provide the in-vehicle navigation apparatus 1 of the present example with the following. In order to reduce the simultaneous connection of HFP and PBAP as much as possible for achieving a more reliable procedure in HFP and PBAP, the time-divided serial connection of HFP and PBAP is performed. Thus, it becomes possible that a secure communication process takes place stably with cellular phones manufactured by many manufactures and compliant with the wireless communication in HFP and the wireless communication in PBAP. In addition, the process by the in-vehicle handsfree apparatus 1 is not complicated; further, it becomes possible to execute the process of PBAP and HFP by the simple process.

In addition, at the time of connecting the wireless communication in HFP after disconnecting the wireless communication in PBAP, an outgoing call to the cellular phone network or an incoming call from the cellular phone network may arise. In such cases, among the outgoing call history data or incoming call history data stored in the work memory 6 at that time, a data item having an oldest outgoing call date and time or incoming date and time is erased and the outgoing call history data or incoming call history data of the in-vehicle navigation apparatus itself is additionally stored in the work memory 6. Thus, whenever an outgoing call to the cellular phone network or an incoming call from the cellular phone network arises, the newest outgoing call history data or the newest incoming call history data of the subject apparatus can be memorized.

In addition, in the state of establishing the communication link with the cellular phones 10, after connecting HFP at S2, it is determined whether the cellular phone 10 is in a phone call state. When the cellular phone 10 is in a phone call state, the wireless communication in PBAP is connected after the phone call is completed and the outgoing call history data, incoming call history data, and phone book data are received from the cellular phone 10. Under such a configuration, the handsfree phone call can be executed without being affected by the transfer of the outgoing call history data, incoming call history data, and phone book data from the cellular phone 10.

Further, in the in-vehicle navigation apparatus 1, under the state of establishing the Bluetooth communication link with the cellular phones 10, when receiving from the cellular phone 10 the outgoing call history data and incoming call history data, which were stored in the cellular phone 10 before establishing the Bluetooth communication link, the in-vehicle navigation apparatus 1 stores, in the work memory 6, the received outgoing call history data and the received incoming call history data, equally to, of the navigation apparatus 1 itself, the outgoing call history data and incoming call history data. An outgoing call operation then becomes possible using the outgoing call history data and incoming call history data, which are stored in the work memory 6. In such a configuration, while an outgoing call can be performed by selecting the desired telephone number among the outgoing call history data or incoming history data, which are transferred automatically from the cellular phone 10, an outgoing call can be performed by selecting the desired telephone number among the outgoing call history data or incoming history data, which are pertinent to the in-vehicle navigation apparatus 1 itself. The usability can be thereby enhanced.

In addition, in case that a display demand of outgoing call history data or incoming call history data occurs, if the same telephone number is present as a destination telephone number or a source telephone number stored in the work memory 6 as the outgoing call history data or incoming call history data, the registration name corresponding to the telephone number is displayed. In such a configuration, the outgoing call history data or incoming call history data received from the cellular phone 10 can be displayed using the registration name stored in the phone book data.

In addition, each time an outgoing call process is performed, the outgoing call history data of the in-vehicle navigation apparatus 1 itself is displayed as the data item having the newest outgoing call date and time in the display list of the outgoing call history data. In contrast, each time an incoming call process is performed, the incoming call history data of the in-vehicle navigation apparatus 1 itself is displayed as the data item having the newest incoming call date and time in the display list of the incoming call history data. Such a configuration can respond to the following case that the date and time acquired by the cellular phone 10 does not accord with the date and time acquired by the in-vehicle navigation apparatus 1, and, further, the outgoing call date and time or incoming call date and time, which are automatically transferred from the cellular phone 10, do not accord with the outgoing call date and time or incoming call date and time of the in-vehicle navigation apparatus 1 itself in a time-axis. Thus, the user can be prevented from feeling the sense of incongruity due to the gap in the date and time between the cellular phone 10 and the in-vehicle navigation apparatus 1.

In addition, the outgoing call history data, incoming call history data, and phone book data may be stored to be distinguished with respect to each of cellular phones 10 in the work memory 6. Under such a configuration, the outgoing call history data, incoming call history data, and phone book data can be managed every cellular phone 10. In addition, the outgoing call history data, incoming call history data, and phone book data may be stored to be distinguished with respect to each of cellular phones 10 in the storage memory 7. Under such a configuration, whenever the power source of the apparatus turns on, it is not necessary to receive phone book data from the cellular phone 10, The user can use promptly the phone book data stored so as to correspond to the cellular phone 10 the user holds, remarkably enhancing the usability at the time of using the phone book function.

Furthermore, when the outgoing call history data, incoming call history data, and missed incoming history data are collectively displayed as the whole history data, with respect to the data items of the outgoing call history data having the identical (overlapped) destination telephone number, the data item having the newest in the outgoing call date and time is only displayed. This configuration allows the increase of the history information.

(Other Embodiments)

The present invention is not limited only to the above-mentioned embodiment, and can be modified or extended as follows.

The in-vehicle handsfree apparatus may include a handsfree dedicated apparatus which mainly realizes the handsfree function. Alternatively, an audio apparatus for reproducing CD or radio can have the handsfree function. In addition, the in-vehicle navigation apparatus 1 may be provided with the portable nature (hand held type).

Without limiting to the configuration where the cellular phone 10 and the in-vehicle navigation apparatus 1 execute the Bluetooth communication, they may execute another short range wireless communication. In addition, they may execute a wired communication.

The outgoing call history data, incoming call history data, and phone book data, which were received from the cellular phone 10 can be stored in the storage memory 7. Whenever the outgoing call history data, incoming call history data, and phone book data are received from the cellular phone 10, the outgoing call history data, incoming call history data, and the phone book data may be updated and stored. The outgoing call history data, incoming call history data, and phone book data, which were received from the cellular phone 10 can be stored in the work memory 6 and the storage memory 7 simultaneously. Thus, the storage memory 7 may be used as a backup memory.

The number of data items of the outgoing call history data or incoming call history data storable in the work memory 6 may be one, respectively. In such cases, when an outgoing call process or incoming call process arises in the in-vehicle navigation apparatus 1, the outgoing call history data and incoming call history data which were received by the wireless communication connection in PBAP is always erased.

In addition, in the in-vehicle navigation apparatus 1, although multiple data items of the outgoing call history data or incoming call history data are displayed simultaneously, every one data item can be displayed. In such cases, for example, the newest data item is displayed first, and the next newest data item may be displayed by an operation via the operation section 4.

The number of data items of the outgoing call history data or incoming call history data storable in the work memory 6 may be one, respectively. In such cases, when an outgoing call process or incoming call process arises in the in-vehicle navigation apparatus 1, the outgoing call history data and incoming call history data which were received by the wireless communication connection in PBAP is always erased.

In the state of establishing the Bluetooth communication link between the cellular phone 10 and the in-vehicle navigation apparatus 1, without limiting to the configuration that the outgoing call history data and incoming call history data are transferred automatically, they may be transferred under the condition that a user operates the in-vehicle navigation apparatus 1 or the cellular phone 10.

In cases that the control section 2 stores in the work memory 6 the outgoing call history data, incoming call history data, and phone book data, which were received from the cellular phones 10, such that the data for each of the cellular phones 10 is distinguished from the other, without limiting to the configuration to associate the data stored in the work memory 6 with the cellular phone 10 by generating a link key, another method may be adopted to associate them with each other.

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer. Furthermore, the software portion or unit or any combinations of multiple software portions or units can be included in a software program, which can be contained in a computer-readable storage media or can be downloaded and installed in a computer via a communications network.

Aspects of the disclosure described herein are set out in the following clauses.

As a first aspect, a control means or unit and an outgoing call history data storage means or unit are comprised. The control means or unit communicates with a cellular phone with a transfer protocol for realizing transfer of the outgoing call history data stored in the cellular phone before being connected using a handsfree protocol with the cellular phone, receives the outgoing call history data from the cellular phone, disconnects the communication using the transfer protocol after the receiving, and connects communication with a handsfree protocol for realizing a handsfree phone call by the cellular phone after the disconnecting. The outgoing call history data storage means or unit stores the received outgoing call history data.

As a second aspect, a transfer protocol control means or unit executes communication using a transfer protocol for realizing transfer of the outgoing call history data stored in the cellular phone before the connection of the handsfree protocol when the cellular phone exists in a wireless connection area. An outgoing call history data reception means or unit receives outgoing call history data from the cellular phone via the communication using the transfer protocol. A transfer protocol disconnection means or unit disconnects the connected communication using the transfer protocol after the receiving. A handsfree protocol control means or unit connects automatically communication using a handsfree protocol for realizing a handsfree phone call by the cellular phone after the disconnecting. An outgoing call history data storage means or unit stores the outgoing call history data which is received.

As a third aspect, a control means or unit and an incoming call history data storage means or unit are comprised. The control means or unit communicates with a cellular phone with a transfer protocol for realizing transfer of the incoming call history data stored in the cellular phone before being connected using a handsfree protocol with the cellular phone, receives the incoming call history data from the cellular phone, disconnects, after receiving, the communication using the transfer protocol, and connects a communication using a handsfree protocol for realizing a handsfree phone call by the cellular phone after disconnecting. The incoming call history data storage means or unit stores the incoming call history data which is received.

As a fourth aspect, the following means or units are comprised. A transfer protocol control means or unit executes communication using a transfer protocol for realizing transfer of the incoming call history data stored in the cellular phone before the connection of the handsfree protocol when the cellular phone exists in a wireless connection area. An incoming call history data reception means or unit receives incoming call history data from the cellular phone via the communication using the transfer protocol. A transfer protocol disconnection means or unit disconnects the connected communication using the transfer protocol after the receiving. A handsfree protocol control means or unit connects automatically communication using a handsfree protocol for realizing a handsfree phone call by the cellular phone after the disconnecting. An incoming call history data storage means or unit stores the received incoming call history data.

As a fifth aspect, the following means or units are comprised. A transfer protocol control means or unit performs a communication using the transfer protocol for realizing transfer of the incoming call history data, the outgoing call history data, and the phone book data stored in the cellular phone prior to the connection for the handsfree phone call when the cellular phone exists in a wireless connection area. A data reception means or unit receives incoming call history data, outgoing call history data, and phone book data from the cellular phone via the communication using the transfer protocol. A transfer protocol disconnection means or unit disconnects the connected communication using the transfer protocol after the receiving. A handsfree protocol control means or unit connects automatically communication using a handsfree protocol for realizing a handsfree phone call by the cellular phone after the disconnecting. A data storage means or unit stores the outgoing call history data, the incoming call history data, and the phone book data, which are received.

As a sixth aspect, the following is comprised. A transfer protocol connecting step connects a transfer protocol between the cellular phone and the in-vehicle handsfree apparatus for realizing a transfer of the outgoing call history data, which was stored in the cellular phone before the connection for the handsfree phone call. An outgoing call history data receiving step receives the outgoing call history data via a communication connected at the transfer protocol connecting step. A disconnecting step automatically disconnects the communication using the transfer protocol after receiving the outgoing call history data. A handsfree connecting step automatically connects communication using the handsfree protocol for realizing the handsfree phone call by the cellular phone after the disconnecting at the disconnecting step.

As a seventh aspect, the following is comprised. A transfer protocol connecting step connects a transfer protocol between the cellular phone and the in-vehicle handsfree apparatus for realizing a transfer of the incoming call history data, which was stored in the cellular phone before the connection for the handsfree phone call. An incoming call history data receiving step receives the incoming call history data via a communication connected at the transfer protocol connecting step. A disconnecting step automatically disconnects the communication using the transfer protocol after receiving the incoming call history data. A handsfree connecting step automatically connects communication using the handsfree protocol for realizing the handsfree phone call by the cellular phone after the disconnecting at the disconnecting step.

Thus, according to the present disclosure, after the data is transferred via the communication using the transfer protocol, the communication using the transfer protocol is disconnected and the communication using the handsfree protocol is then executed. As a result, it is unnecessary to connect the transfer protocol and the handsfree protocol at the same time. While the processing can be reduced in the in-vehicle handsfree apparatus, connectivity with the various types of cellular phones can be improved.

In addition, as another aspect, the control means or unit includes a determination means or unit for determining whether the cellular phone is performing a phone call by connecting an initial communication using a handsfree protocol for realizing a handsfree phone call by the cellular phone prior to the communication using the transfer protocol. When it is determined by the determination means or unit that the phone call is being performed, the control means or unit maintains the initial communication using the handsfree protocol. When it is determined by the determination means or unit that the phone call is completed, the control means or unit connects a communication using the transfer protocol after disconnecting the maintained initial communication using the handsfree protocol.

In addition, as another aspect, an initial handsfree protocol communication means or unit connects automatically an initial communication using a handsfree protocol for realizing a handsfree phone call by the cellular phone prior to the communication using the transfer protocol. A determination means or unit determines whether the cellular phone is during performing a phone call. A communication maintenance means or unit maintains the initial communication using the handsfree protocol when it is determined by the determination means or unit that the phone call is being performed.

When it is determined by the determination means or unit that the phone call is completed, the transfer protocol control means or unit connects a communication using the transfer protocol after disconnecting the maintained initial communication using the handsfree protocol.

In addition, as another aspect, the control means or unit includes a determination means or unit for determining whether the cellular phone is performing a phone call by connecting an initial communication using a handsfree protocol for realizing a handsfree phone call by the cellular phone prior to the communication using the transfer protocol. When it is determined by the determination means or unit that the phone call is being performed, the control means or unit maintains the initial communication using the handsfree protocol. When it is determined by the determination means or unit that the phone call is completed, the control means or unit connects a communication using the transfer protocol after disconnecting the maintained initial communication using the handsfree protocol.

In addition, as another aspect, an initial handsfree protocol communication means or unit connects automatically an initial communication using a handsfree protocol for realizing a handsfree phone call by the cellular phone prior to the communication using the transfer protocol. A determination means or unit determines whether the cellular phone is during performing a phone call. A communication maintenance means or unit maintains a wireless communication using the handsfree protocol when it is determined by the determination means or unit that the phone call is being performed. When it is determined by the determination means or unit that the phone call is completed, the transfer protocol control means or unit connects a communication using the transfer protocol after disconnecting the maintained initial communication using the handsfree protocol.

In addition, as another aspect, an initial handsfree protocol communication means or unit connects automatically an initial communication using a handsfree protocol for realizing a handsfree phone call by the cellular phone prior to the communication using the transfer protocol. A determination means or unit determines whether the cellular phone is during performing a phone call. A communication maintenance means or unit maintains the initial communication using the handsfree protocol when it is determined by the determination means or unit that the phone call is being performed. When it is determined by the determination means or unit that the phone call is completed, the transfer protocol control means or unit connects a communication using the transfer protocol after disconnecting the maintained initial communication using the handsfree protocol.

In addition, as another aspect, an initial handsfree protocol connecting step first connects automatically an initial communication using a handsfree protocol for realizing a handsfree phone call by the cellular phone before the transfer protocol connecting step. A determining step determines whether the cellular phone is performing a phone call by the initial communication using the handsfree protocol connected at the initial handsfree protocol connecting step. a maintaining step maintains the initial communication using the handsfree protocol when it is determined at the determining step that the phone call is being performed. A handsfree protocol disconnecting step disconnects the initial communication using the handsfree protocol maintained at the maintaining step when it is determined that the phone call is completed in the determining step. After disconnecting the handsfree protocol at the handsfree protocol disconnecting step, the transfer protocol connecting step is executed.

In addition, as another aspect, an initial handsfree protocol connecting step first connects automatically an initial communication using a handsfree protocol for realizing a handsfree phone call by the cellular phone before the transfer protocol connecting step. A determining step determines whether the cellular phone is performing a phone call by the initial communication using the handsfree protocol connected at the initial handsfree protocol connecting step. A maintaining step maintains the initial communication using the handsfree protocol when it is determined at the determining step that the phone call is being performed. A handsfree protocol disconnecting step disconnects the initial communication using the handsfree protocol maintained at the maintaining step when it is determined that the phone call is completed in the determining step. After disconnecting the handsfree protocol at the handsfree protocol disconnecting step, the transfer protocol connecting step is executed.

Thus, before the communication using the transfer protocol, the communication using the handsfree protocol is executed and it is determined whether the cellular phone is under a phone call state. When it is under a phone call state, the communication using the handsfree protocol is maintained. In contrast, when it determined that it is not under a phone call state, i.e., when the phone call is completed, the communication using the handsfree protocol is disconnected. The communication using the transfer protocol is then made. Accordingly, when the cellular phone, which is independently under a telephone call, is connected with the in-vehicle handsfree apparatus, the communication using the transfer protocol is not executed. Thus, it becomes possible to change the phone call independently performed by the cellular phone to the handsfree phone call using the in-vehicle handsfree apparatus.

In addition, as another aspect, a display means or unit displays the outgoing call history data. An operation means or unit performs an outgoing call instruction to the cellular phone. A display control means or unit causes the display means or unit to display self outgoing call history data indicating the telephone number of the destination in the outgoing call instruction as being newer in an outgoing call date and time than the outgoing call history data when a display demand of the outgoing call history data occurs after an outgoing call instruction is performed by the operation means or unit in the communication state using the handsfree protocol for realizing the handsfree phone call by the cellular phone after disconnecting the communication using the transfer protocol.

In addition, as another aspect, a display means or unit displays the incoming call history data. A display control means or unit receives, of the incoming call, a source telephone number, which is notified of via the communication using the handsfree protocol, as new incoming call history data, when the cellular phone receives a new incoming call, in the communication state using the handsfree protocol for realizing the handsfree phone call by the cellular phone after disconnecting the communication using the transfer protocol, and causing the display means or unit to display the new incoming call history data as being newer in incoming call date and time than the incoming call history data when a display demand of the new incoming call history data occurs after receiving the incoming call history data.

Herein, after the transfer of the outgoing call history data and incoming call history data is made by the communication using the transfer protocol, the communication using the handsfree protocol is substituted. This makes it impossible to receive the outgoing call history data or incoming call history data using the transfer protocol. So, in the present case, it is noted that new outgoing call history data or new incoming call history data can be acquired by the in-vehicle handsfree apparatus. Further, the new outgoing call history data or the new incoming call history data is displayed as a newer data item than the data received by the transfer protocol. It thus becomes possible to display the history data in an order of the user's actual outgoing calls and incoming calls.

In addition, as another aspect, the outgoing call history data is transmitted from the cellular phone in such a format that an order of outgoing calls is identifiable; and the display control means or unit causes the display means or unit to display the outgoing call history data in an order of outgoing calls according to the format instead of using the received outgoing call date and time data in order to determine a display order.

In addition, as another aspect, the incoming call history data is transmitted from the cellular phone in such a format that an order of incoming calls is identifiable; and the display control means or unit causes the display means or unit to display in an order of incoming calls according to the format instead of using the received incoming call date and time data in order to determine a display order.

More specifically, the outgoing call history data and incoming call history data received by the transfer protocol contain the outgoing call date and time data and incoming call date and time data. If such date and time data is used for rearranging the order, it may be different from the actual order of the outgoing calls and incoming calls. Thus, when the outgoing call history data and incoming call history data are transmitted in such a format which can identify the actual order of the outgoing call dates and times and incoming call dates and times, Although the in-vehicle handsfree apparatus receives the outgoing call date and time data and incoming call date and time data, the in-vehicle handsfree apparatus displays the outgoing call history data and incoming call history data according to the identifiable format, without using the received date and time data. This enables the in-vehicle handsfree apparatus to display the outgoing call history data and incoming call history data in accordance with the actual order of the outgoing calls and incoming calls.

In addition, as another aspect, a phone book transfer setting means or unit sets up either affirmation or negation of a transfer of the phone book data. A data transfer designation means or unit transfers only the outgoing call history data and incoming call history data when the phone book transfer setting means or unit does not set up the negation of the transfer.

Here, the outgoing call history data and incoming call history data generally have the less data volume than the phone book data and more frequently used than the phone book data. Thus, the transfer setting of the phone book data is made possible. When the setting is set not to transfer the phone book data, only the outgoing call history data and incoming call history data are transferred, thus allowing the reduction of the data volume to be transmitted. As a result, the communication using the transfer protocol can be executed promptly, thus allowing the communication using the subsequent handsfree protocol to be executed at an early stage. Thus, the time up to the execution of the handsfree phone call can be shortened when the cellular phone is brought in the vehicle.

In addition, as another aspect, a manual transfer protocol instruction means or unit acquires only the phone book data by executing the transfer protocol manually. In a state where a wireless communication is being performed using a handsfree protocol by the handsfree protocol control means or unit, a communication using the transfer protocol is executed after disconnecting the communication using the handsfree protocol when execution of the transfer protocol is demanded by the manual transfer protocol instruction means or unit; and the handsfree protocol control means or unit executes a communication using the handsfree protocol automatically after the transfer of the phone book data is completed.

Thereby, the transfer of the phone book data can be attained by the user's manual operation if needed, improving the usability. The communication in handsfree protocol is automatically executed after the transfer is completed; therefore, when performing an outgoing call using the phone book data, the handsfree phone call can be possible, enhancing the usability.

Although particular embodiments of the invention have been described, it should be understood that these are not intended to limit the invention to the particular form disclosed, but on the contrary, the invention covers all modifications, equivalents, and alternatives falling within the scope of the present invention as defined by the appended claims.

The invention claimed is:

1. An in-vehicle handsfree apparatus allowing a handsfree phone call by establishing a wireless connection with a cellular phone, the cellular phone storing incoming call history data indicating a source telephone number of an incoming call, outgoing call history data indicating a destination telephone number of an outgoing call, and phone book data in which a telephone number and a registration name corresponding to the telephone number are registered, the handsfree apparatus comprising:
  a transfer protocol control unit performing, when the cellular phone exists in a wireless connection area, communication using a transfer protocol for realizing transfer of the incoming call history data, the outgoing call history data, and the phone book data, wherein the incoming call history data, the outgoing call history data, and the phone book data were stored in the cellular phone prior to the wireless connection established between the handsfree apparatus and the cellular phone;
  a data reception unit receiving incoming call history data, outgoing call history data, and phone book data from the cellular phone via the communication using the transfer protocol;
  a transfer protocol disconnection unit disconnecting the connected communication using the transfer protocol after the receiving;
  a handsfree protocol control unit connecting automatically communication using a handsfree protocol for realizing a handsfree phone call by the cellular phone after the disconnecting; and
  a data storage unit storing the outgoing call history data, the incoming call history data, and the phone book data, which are received; wherein
  the outgoing call history data and the incoming call history data are always transmitted earlier than the phone book data from the cellular phone via the communication using the transfer protocol to enable an option of not transferring the phone book data.

2. The in-vehicle handsfree apparatus according to claim 1, further comprising:
  an initial handsfree protocol communication unit connecting automatically an initial communication using a handsfree protocol for realizing a handsfree phone call by the cellular phone prior to the communication using the transfer protocol;
  a determination unit determining whether the cellular phone is performing a phone call; and a communication maintenance unit maintaining the initial communication using the handsfree protocol when it is determined by the determination unit that the phone call is being performed, wherein when it is determined by the determination unit that the phone call is completed, the transfer protocol control unit connects communication using the transfer protocol after disconnecting the maintained initial communication using the handsfree protocol.

3. The in-vehicle handsfree apparatus according to claim 2, wherein:

the initial handsfree protocol communication unit receives, of the cellular phone, a communication state, which is notified via the communication using the handsfree protocol, by connecting the initial communication prior to the communication using the transfer protocol; and the determination unit determines whether the communication state of the cellular phone is performing a phone call.

4. The in-vehicle handsfree apparatus according to claim 2, wherein when it is determined, prior to the communication using the transfer protocol, by the determination unit that the phone call is not being performed, the transfer protocol control unit disconnects the initial communication using the handsfree protocol and then connects communication using the transfer protocol.

5. The in-vehicle handsfree apparatus according to claim 1, further comprising:

a phone book transfer setting unit setting up either affirmation or negation of a transfer of the phone book data; and a data transfer designation unit transferring only the outgoing call history data and incoming call history data when the phone book transfer setting unit sets up the negation of the transfer.

6. An in-vehicle handsfree apparatus allowing a handsfree phone call by establishing a wireless connection with a cellular phone, the cellular phone storing incoming call history data indicating a source telephone number of an incoming call, outgoing call history data indicating a destination telephone number of an outgoing call, and phone book data in which a telephone number and a registration name corresponding to the telephone number are registered, the handsfree apparatus comprising:

a transfer protocol control unit performing communication using a transfer protocol for realizing transfer of the incoming call history data, the outgoing call history data, and the phone book data stored in the cellular phone prior to the wireless connection established between the handsfree apparatus and the cellular phone when the cellular phone exists in a wireless connection area;

a data reception unit receiving incoming call history data, outgoing call history data, and phone book data from the cellular phone via the communication using the transfer protocol;

a transfer protocol disconnection unit disconnecting the connected communication using the transfer protocol after the receiving;

a handsfree protocol control unit connecting automatically communication using a handsfree protocol for realizing a handsfree phone call by the cellular phone after the disconnecting;

a data storage unit storing the outgoing call history data, the incoming call history data, and the phone book data, which are received;

a phone book transfer setting unit setting up either affirmation or negation of a transfer of the phone book data; and a data transfer designation unit transferring only the outgoing call history data and incoming call history data when the phone book transfer setting unit sets up the negation of the transfer; and a manual transfer protocol instruction unit acquiring only the phone book data by executing the transfer protocol manually, wherein:

in a state where a wireless communication is being performed using a handsfree protocol by the handsfree protocol control unit, communication using the transfer protocol is executed after disconnecting the communication using the handsfree protocol when execution of the transfer protocol is demanded by the manual transfer protocol instruction unit; and the handsfree protocol control unit executes communication using the handsfree protocol automatically after the transfer of the phone book data is completed.

7. An in-vehicle handsfree apparatus allowing a handsfree phone call by establishing a wireless connection with a cellular phone, the cellular phone storing incoming call history data indicating a source telephone number of an incoming call, outgoing call history data indicating a destination telephone number of an outgoing call, and phone book data in which a telephone number and a registration name corresponding to the telephone number are registered, the handsfree apparatus comprising:

an initial handsfree protocol communication unit automatically connecting an initial communication using a handsfree protocol for realizing a handsfree phone call by the cellular phone, when the cellular phone first comes to exist in a wireless connection area;

a determination unit determining whether the cellular phone is performing a phone call;

a communication maintenance unit maintaining the initial communication using the handsfree protocol when it is determined by the determination unit that the phone call is being performed;

a transfer protocol control unit delaying communication using a transfer protocol for realizing transfer of the incoming call history data, the outgoing call history data, and the phone book data, until after disconnecting the maintained initial communication using the handsfree protocol when it is determined by the determination unit that the phone call is completed;

wherein the incoming call history data, the outgoing call history data and the phone book data were stored in the cellular phone prior to the wireless connection established between the handsfree apparatus and the cellular phone;

a data reception unit receiving incoming call history data, outgoing call history data, and phone book data from the cellular phone via the communication using the transfer protocol;

a transfer protocol disconnection unit disconnecting the connected communication using the transfer protocol after the data reception unit receives the incoming call history data, outgoing call history data, and phone book data from the cellular phone;

a handsfree protocol control unit automatically connecting communication using a handsfree protocol for realizing the handsfree phone call by the cellular phone after the transfer protocol disconnection unit disconnects the connected communication using the transfer protocol; and a data storage unit storing the outgoing call history data, the incoming call history data, and the phone book data, which are received.

8. The in-vehicle handsfree apparatus according to claim 7, wherein
the outgoing call history data and the incoming call history data are transmitted earlier than the phone book data.

9. The in-vehicle handsfree apparatus according to claim 7, wherein:
the initial handsfree protocol communication unit receives, of the cellular phone, a communication state, which is notified via the communication using the handsfree protocol, by connecting the initial communication prior to the communication using the transfer protocol; and
the determination unit determines whether the communication state of the cellular phone is performing a phone call.

10. The in-vehicle handsfree apparatus according to claim 7, wherein
when it is determined, prior to the communication using the transfer protocol, by the determination unit that the phone call is not being performed, the transfer protocol control unit disconnects the initial communication using the handsfree protocol and then connects communication using the transfer protocol.

11. The in-vehicle handsfree apparatus according to claim 7, further comprising:
a phone book transfer setting unit setting up either affirmation or negation of a transfer of the phone book data; and
a data transfer designation unit transferring only the outgoing call history data and incoming call history data when the phone book transfer setting unit sets up the negation of the transfer.

* * * * *